US012147068B2

(12) United States Patent
Inoue et al.

(10) Patent No.: US 12,147,068 B2
(45) Date of Patent: Nov. 19, 2024

(54) LIGHT GUIDE MEMBER FOR ILLUMINATION DEVICE, AND ILLUMINATION DEVICE

(71) Applicant: NITTO DENKO CORPORATION, Osaka (JP)

(72) Inventors: Koichi Inoue, Osaka (JP); Yufeng Weng, Osaka (JP); Kozo Nakamura, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/568,344

(22) PCT Filed: Jun. 8, 2022

(86) PCT No.: PCT/JP2022/023119
§ 371 (c)(1),
(2) Date: Dec. 8, 2023

(87) PCT Pub. No.: WO2022/260080
PCT Pub. Date: Dec. 15, 2022

(65) Prior Publication Data
US 2024/0272343 A1    Aug. 15, 2024

(30) Foreign Application Priority Data
Jun. 9, 2021    (JP) .................. 2021-096846

(51) Int. Cl.
*F21V 8/00*    (2006.01)
*G02B 1/11*    (2015.01)

(52) U.S. Cl.
CPC .............. *G02B 6/0016* (2013.01); *G02B 1/11* (2013.01); *G02B 6/0018* (2013.01); *G02B 6/003* (2013.01); *G02B 6/0073* (2013.01)

(58) Field of Classification Search
CPC .... G02B 6/0016; G02B 6/0018; G02B 6/003; G02B 6/0073; G02B 1/11
See application file for complete search history.

(56) References Cited

U.S. PATENT DOCUMENTS

| 10,393,947 B2* | 8/2019 | Bang ................... G02B 6/0065 |
| 2001/0012158 A1* | 8/2001 | Umemoto ................ G02B 1/10 |
| | | 359/599 |

(Continued)

FOREIGN PATENT DOCUMENTS

| WO | 2011/124765 | 10/2011 |
| WO | 2019/087118 | 5/2019 |

(Continued)

OTHER PUBLICATIONS

International Search Report issued in International Patent Application No. PCT/JP2022/023119, dated Jul. 19, 2022.

(Continued)

*Primary Examiner* — Mary Ellen Bowman
(74) *Attorney, Agent, or Firm* — GREENBLUM & BERNSTEIN, P.L.C.

(57) ABSTRACT

A lightguide component for illumination devices having first and second exit surfaces at opposite sides, the lightguide component including: a light-receiving portion to receive light emitted from a light source; a lightguide layer having a first principal face at the first exit surface side and a second principal face at the second exit surface side; and a light distribution controlling structure having a plurality of internal spaces. Each of the plurality of internal spaces includes a first slope to direct a portion of light propagating in the lightguide layer toward the first exit surface via total internal reflection, and a second slope at an opposite side from the first slope, and the lightguide component is configured to emit first light having a first intensity distribution through (Continued)

the first exit surface and to emit second light having a second intensity distribution through the second exit surface.

15 Claims, 18 Drawing Sheets

(56) References Cited

U.S. PATENT DOCUMENTS

| | | | | |
|---|---|---|---|---|
| 2013/0063955 | A1* | 3/2013 | Rinko | B29D 11/0073 |
| | | | | 156/60 |
| 2020/0257044 | A1* | 8/2020 | Rinko | G02B 6/12002 |
| 2020/0348462 | A1* | 11/2020 | Hattori | B32B 27/325 |
| 2021/0109274 | A1 | 4/2021 | Rinko et al. | |
| 2022/0196904 | A1 | 6/2022 | Fujii et al. | |
| 2023/0280523 | A1* | 9/2023 | Nakamura | G02B 1/18 |
| | | | | 427/164 |

FOREIGN PATENT DOCUMENTS

| | | |
|---|---|---|
| WO | 2019/102959 | 5/2019 |
| WO | 2019/146628 | 8/2019 |
| WO | 2019/182091 | 9/2019 |
| WO | 2020/175523 | 9/2020 |

OTHER PUBLICATIONS

Written Opinion issued in International Patent Application No. PCT/JP2022/023119, dated Jul. 19, 2022.
Japan, Notice of Reasons for Refusal issued in JP Application No. 2023-527895, dated Jan. 16, 2024.
Japan, Decision to Grant a Patent issued in JP Application No. 2023-527895, dated Mar. 19, 2024.

* cited by examiner

LIGHT GUIDE MEMBER FOR ILLUMINATION DEVICE, AND ILLUMINATION DEVICE

TECHNICAL FIELD

The present invention relates to: lightguide components for illumination devices; and illumination devices, and more particularly to: sheet-shaped lightguide components for illumination devices having a light source and a lightguide layer; and illumination devices. It is meant herein that being "sheet-shaped" is inclusive of being plate-shaped or film-shaped, irrespective of the rigidity (flexibility) and thickness of the sheet. Note that a sheet-shaped illumination device may be used in various forms, e.g., in roll form.

BACKGROUND ART

Sheet-shaped illumination devices that include a light source and a lightguide layer are used in backlights or frontlights of liquid crystal display devices, for example. In recent years, use of next-generation solid state lighting (SSL), such as LED illumination, has been promoted. For example, lighting good with design or fun, called architainment lighting, has been proposed that is based on e.g. combinations of a construction component and an illumination device.

For example, Patent Document 1 discloses a one-side illumination-cum-window having a light source at an end of a plate-shaped transparent base, such that, for illumination at night, the one-side illumination-cum-window functions as an illumination device allowing light that has been emitted from the light source and guided in the transparent base to be output through one surface of the transparent base, and for non-illumination during day, the one-side illumination-cum-window functions as a transparent window. Patent Documents 2 to 5 disclose sheet-shaped illumination device having light distribution structures which utilize total reflection at interfaces between air cavities (internal spaces). The entire disclosure of Patent Documents 2 to 5 is incorporated herein by reference.

CITATION LIST

Patent Literature

[Patent Document 1] International Publication No. 2019/102959
[Patent Document 2] International Publication No. 2019/182091
[Patent Document 3] International Publication No. 2019/146628
[Patent Document 4] International Publication No. 2011/124765
[Patent Document 5] International Publication No. 2019/087118

SUMMARY OF INVENTION

Technical Problem

Any conventional sheet-shaped illumination device emits light through only one of two principal faces of the illumination device that are oriented in opposite directions from each other. The present invention aims to provide sheet-shaped lightguide components for illumination devices and illumination devices that are capable of emitting light from two principal faces that are oriented in opposite directions from each other.

Solution to Problem

According to embodiments of the present invention, means for solution as recited in the following Items are provided.

[Item 1]
A lightguide component for illumination devices having a first exit surface and a second exit surface at an opposite side from the first exit surface, the lightguide component comprising:
  a light-receiving portion to receive light emitted from a light source;
  a lightguide layer having a first principal face at the first exit surface side and a second principal face at the second exit surface side; and
  a light distribution controlling structure having a plurality of internal spaces, wherein,
  each of the plurality of internal spaces includes a first slope to direct a portion of light propagating in the lightguide layer toward the first exit surface via total internal reflection, and a second slope at an opposite side from the first slope, and
  the lightguide component is configured to emit first light having a first intensity distribution through the first exit surface and to emit second light having a second intensity distribution through the second exit surface.

[Item 2]
The lightguide component for illumination devices of Item 1, wherein, given a first principal ray being defined as a ray having a largest intensity in the first intensity distribution and a second principal ray being defined as a ray having a largest intensity in the second intensity distribution, an intensity of the first principal ray: an intensity of the second principal ray is within a range from 1:4 to 4:1.

[Item 3]
The lightguide component for illumination devices of Item 2, wherein the intensity of the first principal ray/the intensity of the second principal ray is within a range from 0.5 to 1.3.

[Item 4]
The lightguide component for illumination devices of Item 2 or 3, wherein a polar angle θ1 of the first principal ray from a normal of the first exit surface is smaller than a polar angle θ2 of the second principal ray from a normal of the second exit surface.

[Item 5]
The lightguide component for illumination devices of Item 4, wherein the polar angle θ1 is 0° or more but less than 40°, and the polar angle θ2 is 30° or more but less than 70°.

[Item 6]
The lightguide component for illumination devices of any one of Items 1 to 5, wherein the first principal ray has a half maximum angle of 67° or less along a light-guiding direction of the lightguide layer.

[Item 7]
The lightguide component for illumination devices of any one of Items 1 to 6, wherein the first principal ray has a half maximum angle of 24° or more along a light-guiding direction of the lightguide layer.

[Item 8]
The lightguide component for illumination devices of any one of Items 1 to 7, wherein the light distribution controlling structure is formed in a redirection layer that is disposed at the first principal face side or the second principal face side of the lightguide layer.

[Item 9]

The lightguide component for illumination devices of any one of Items 1 to 8, wherein a sloping angle $\theta a$ of the first slope is not less than 10° and not more than 70°.

[Item 10]

The lightguide component for illumination devices of any one of Items 1 to 9, wherein a sloping angle $\theta b$ of the second slope is not less than 50° and not more than 100°.

[Item 11]

The lightguide component for illumination devices of any one of Items 1 to 10, wherein, when the lightguide layer is viewed from a normal direction of the first principal face of the lightguide layer, a ratio of an area of the plurality of internal spaces to an area of the lightguide layer is 80% or less.

[Item 12]

The lightguide component for illumination devices of any one of Items 1 to 11, wherein the plurality of internal spaces are disposed discretely along a light-guiding direction of the lightguide layer and along a direction that intersects the light-guiding direction.

[Item 13]

The lightguide component for illumination devices of any one of Items 1 to 12, wherein, when the lightguide layer is viewed from a normal direction of the first principal face of the lightguide layer, the first slope presents a curved surface that is convex toward the light source.

[Item 14]

The lightguide component for illumination devices of any one of Items 1 to 13, having a visible light transmittance of 60% or more and a haze value of less than 30%.

[Item 15]

An illumination device comprising:
the lightguide component for illumination devices The lightguide component for illumination devices of any one of Items 1 to 14; and
a light source to emit light toward the light-receiving portion.

Advantageous Effects of Invention

According to embodiments of the present invention, sheet-shaped lightguide components for illumination devices and illumination devices that are capable of emitting light from two principal faces that are oriented in opposite directions from each other are provided. A lightguide component for illumination devices according to an embodiment has a visible light transmittance of 60% or more and a haze value of less than 30%, such that an object (indication) is easily visible through the lightguide component for illumination devices.

DESCRIPTION OF EMBODIMENTS

Hereinafter, with reference to the drawings, a lightguide component for illumination devices and an illumination device according to embodiments of the present invention will be described. Lightguide components for illumination devices and illumination devices according to embodiments of the present invention are not limited to those exemplified below.

Figure 1:
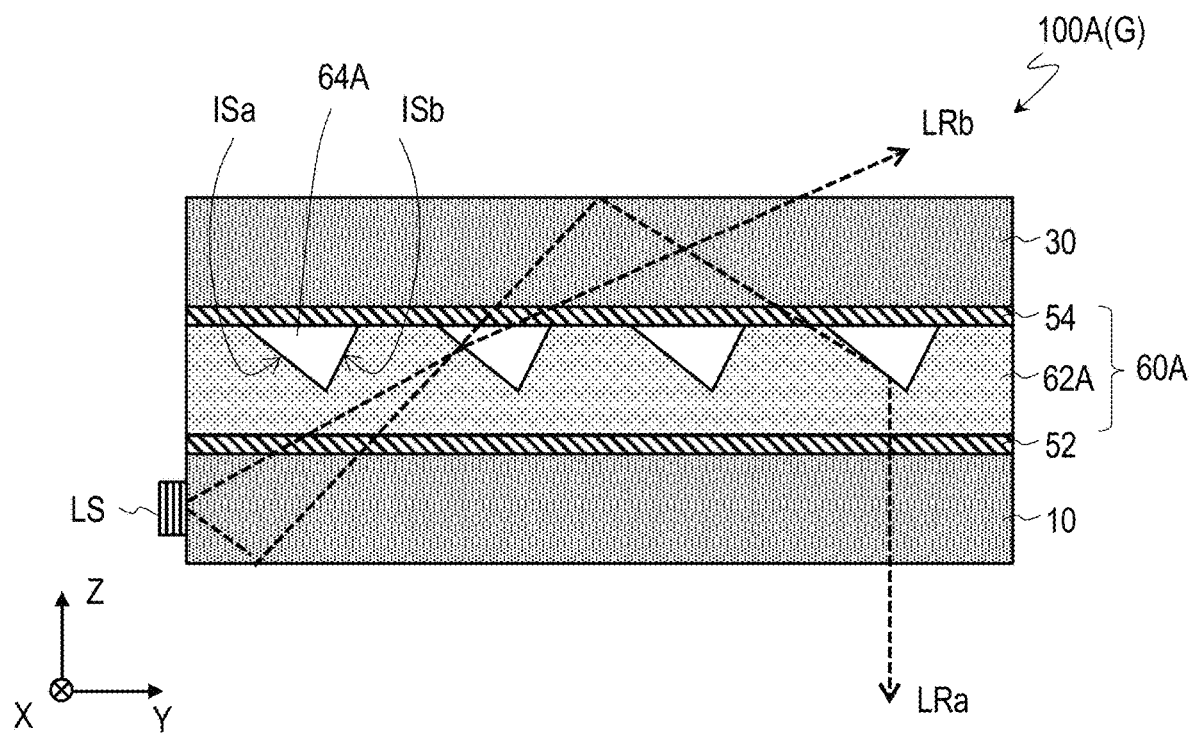
FIG. 1 A schematic cross-sectional view of an illumination device 100A according to an embodiment of the present invention.

FIG. 1 shows a schematic cross-sectional view of an illumination device 100A according to an embodiment of the present invention. The illumination device 100A is a sheet-shaped illumination device having two exit surfaces that are oriented in opposite directions from each other. The illumination device 100A has a first exit surface (lower in FIG. 1) through which first light LRa is emitted and a second exit surface (upper in FIG. 1) through which second light LRb is emitted. In FIG. 1, the first light LRa is emitted in the −Z direction, and the second light LRb is emitted in the Z direction.

The illumination device 100A includes a light source LS and a lightguide component 100A(G) for illumination devices. The letter (G), added after the reference numeral of the illumination device 100A, symbolizes a lightguide component for illumination devices. The lightguide component 100A(G) for illumination devices includes: a light-receiving portion to receive light emitted from the light source LS; a lightguide layer 10 having a first principal face at the first exit surface side and a second principal face at the second exit surface side; and a light distribution controlling structure having a plurality of internal spaces 64A. The light-receiving portion of the lightguide component 100A(G) for illumination devices is a side face (light-receiving side face) of the lightguide layer 10 at the light source LS side, for example. Each of the plurality of internal spaces 64A includes: a first slope ISa to direct a portion of light propagating in the lightguide layer 10 toward the first exit surface via total internal reflection (TIR); and a second slope ISb at an opposite side from the first slope ISa. The second light LRb, emitted through the second exit surface, is light which has entered into the internal space 64A through the first slope ISa and which has passed through the internal space 64A. The second light LRb is transmitted through an upper face (i.e., an interface with an adhesive layer 54) or the second slope ISb of the internal space 64A. It will be appreciated that, when passing through the interface, the first light LRa and the second light LRb may be refracted in accordance with the refractive index of the substance composing the interface.

In the lightguide component 100A (G) for illumination devices, the light distribution controlling structure having the plurality of internal spaces 64A is formed in a redirection layer 60A that is disposed at the second principal face side of the lightguide layer 10. The redirection layer 60A having the plurality of internal spaces 64A is constituted by the adhesive layer 54 and a textured film 62A having recesses 64A (indicated by the same reference numeral as the internal spaces 64A) on its surface. Without being limited to this example, the internal spaces 64A may be formed in a redirection layer 60B that is disposed at the first principal face of the lightguide layer 10, as will be described later with reference to FIG. 17A and the like, for example. Alternatively, the plurality of internal spaces 64A (or internal spaces 64B in FIG. 17A and the like) may be formed in the lightguide layer 10.

With the light distribution controlling structure, the lightguide component 100A(G) for illumination devices is configured to emit first light LRa having a first intensity distribution through the first exit surface and emit second light LRb having a second intensity distribution through the second exit surface. For example, given a first principal ray being defined as a ray having a largest intensity in the first intensity distribution and a second principal ray being defined as a ray having a largest intensity in the second intensity distribution, an intensity of the first principal ray: an intensity of the second principal ray can be controlled to within a range from 1:4 to 4:1, for example. As will be indicated below by simulation results, the intensity of the first principal ray/the intensity of the second principal ray is within a range from 0.5 to 1.3, for example. Therefore, both of the first light LRa and the second light LRb can be used for illumination.

For example, a polar angle θ1 of the first principal ray from a normal of the first exit surface is smaller than a polar angle θ2 of the second principal ray from a normal of the second exit surface. For example, the polar angle θ1 is 0° or more but less than 40°, and the polar angle θ2 is 30° or more but less than 70°. The first intensity distribution and the second intensity distribution can be controlled by adjusting the cross-sectional shape, planar shape, size, density of placement, and distribution of the internal spaces 64A (or the internal spaces 64B in FIG. 17A and the like), for example. As will be described below with reference to FIG. 3A, the first slope ISa has a sloping angle θa of not less than 10° and not more than 70°, for example. The second slope ISb has a sloping angle θb of not less than 50° and not more than 100°. As is illustrated herein, the internal spaces 64A may have a triangular cross-sectional shape, but this is not a limitation; it may be a trapezoid or the like.

The lightguide component 100A(G) for illumination devices may be characterized by a visible light transmittance of 60% or more and a haze value of less than 30%, for example. The visible light transmittance is preferably 70% or more, and still more preferably 80% or more. The haze value is preferably less than 10%, and still more preferably 5% or less. Because the lightguide component 100A(G) for illumination devices of according to an embodiment of the present invention has a high visible light transmittance and a low haze value, it is possible to see an object (indication) through the lightguide component 100A (G) for illumination devices. It is assumed herein that light having a wavelength of not less than 380 nm and not more than 780 nm is visible light. The visible light transmittance and the haze value can be measured by using a haze meter (manufactured by MURAKAMI COLOR RESEARCH LABORATORY CO., LTD.: product name HM-150), for example.

When the lightguide layer 10 is viewed from the normal direction of its principal face, the plurality of internal spaces 64A being a light distribution controlling structure are such that: a ratio of the area of the plurality of internal spaces 64A to the area of the lightguide layer 10 (occupied area percentage) is preferably not less than 1% and not more than 80%, and its upper limit value is more preferably 50% or less, and still more preferably 45% or less; in order to obtain a high transmittance and/or a low haze value, it is preferably 30% or less, still more preferably 10% or less, and still more preferably 5% or less. For example, when the internal spaces have an occupied area percentage of 50%, a haze value of 30% can be obtained. Note that the occupied area percentage of the internal spaces 64A may be uniform; or, in order to prevent a decrease in luminance with increasing distance from the light source LS, the occupied area percentage may be allowed to increase with increasing distance. In order to enable mass production by a roll-to-roll method or a roll-to-sheet method, the occupied area percentage of the internal spaces 64A is preferably uniform.

In the lightguide component 100A (G) for illumination devices, the textured film 62A is bonded to the second principal face of the lightguide layer 10 by an adhesive layer 52, such that the adhesive layer 54 (which constitutes the redirection layer 60A together with the textured film 62A) causes the base layer 30 and the textured film 62A to be bonded together. The lightguide layer 10 and the base layer 30 may be transparent substrates or films. Preferable configurations for the lightguide layer 10, the base layer 30, the textured film 62A, and the adhesive layers 52 and 54 will be described later.

Figure 2:
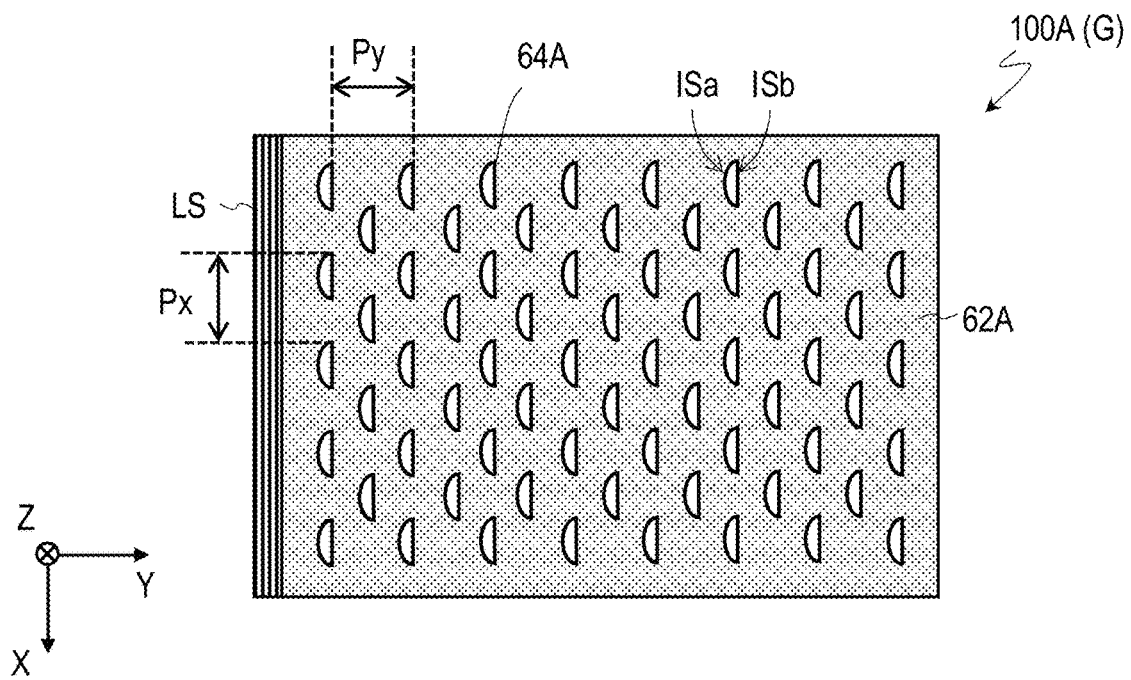
FIG. 2 A schematic plan view of the illumination device 100A.

Next, with reference to FIG. 2, examples of the planar shape and placement of the internal spaces 64A will be described. FIG. 2 shows a schematic plan view of the illumination device 100A.

As shown in FIG. 2, the plurality of internal spaces 64A are disposed discretely along a light-guiding direction (the Y direction) of the lightguide layer 10 and along a direction (the X direction) that is orthogonal to the light-guiding direction, for example. As for the size (length L, width W: see FIG. 3A and FIG. 3B) of the internal spaces 64A, their length L is preferably not less than 10 µm and not more than 500 µm and their width W is preferably not less than 1 µm and not more than 100 µm, for example. From the standpoint of light extraction efficiency, their height H (see FIG. 3A) is preferably not less than 1 µm and not more than 100 µm.

Although an example is illustrated herein where the plurality of internal spaces 64A are disposed discretely along the light-guiding direction (the Y direction) of the lightguide layer 10 and along a direction (the X direction) that is orthogonal to the light-guiding direction, this is not a limitation; the plurality of internal spaces 64A may be disposed discretely along the light-guiding direction (the Y direction) of the lightguide layer 10 and along any direction that intersects the light-guiding direction. The discrete placement of the internal spaces 64A may be set as appropriate, in accordance with the shape of the lightguide layer 10, required intensity distribution, etc. Although light may propagate in various directions within the lightguide layer 10, the Y direction will be referred to as the light-guiding direction, whereas light having a (non-zero) component in the Y direction will be said to be propagating in the Y direction. The same is also true of any other direction. In other words, light propagating in the −Y direction encompasses all light that has a (non-zero) component in the −Y direction.

The plurality of internal spaces 64 are disposed discretely along the light-guiding direction and along a direction that intersects the light-guiding direction, for example. A discrete placement may have periodicity (regularity) along at least one direction, or may not have any regularity. However, from a mass producibility standpoint, it is preferable that the plurality of internal spaces 64 are disposed uniformly. For example, in the example shown in FIG. 2, a plurality of internal spaces 64 having a curved surface of a substantially identical shape, which is convex in an identical direction, are disposed discretely and periodically along a light-guiding direction of the lightguide layer 10 (the Y direction) and a direction (the X direction) that is orthogonal to the light-guiding direction, across the entire area. In this case, a pitch Px is preferably e.g. not less than 10 µm and not more than 500 µm, and a pitch Py is preferably e.g. not less than 10 µm and not more than 500 µm. In the example shown in FIG. 2, some internal spaces 64 are disposed with a ½ pitch shift in each of the Y direction and the X direction. In Examples 1 and 2 to be described later, Px is 200 µm and Py is 100 µm; in Example 3 and Example 4 to be described later, Px is 260 µm and Py is 160 µm.

As shown in FIG. 2, when viewed from the normal direction of the first principal face of the lightguide layer 10, the first slope ISa presents a curved surface that is convex toward the light source LS. The light source LS is may be, for example, LED devices, such that multiple LED devices are arranged along the X direction. Light emitted from each of the plurality of LED devices has some spread with respect to the Y direction; therefore, in order to uniformly act on light, the first slope ISa may have a curved surface that is convex toward the light source LS. The first slope ISa may be parallel to the X direction when coupling optics are provided between the light source LS and the light-receiving portion of the lightguide component 100A (G) for illumination devices so as to allow light of a high degree of parallelism (i.e., light which does not have much spread with respect to the Y direction) to enter. Instead of discrete internal spaces 64A, for example, internal spaces may be provided in the form of grooves extending along the X direction (e.g., triangular prisms).

Figure 3A:
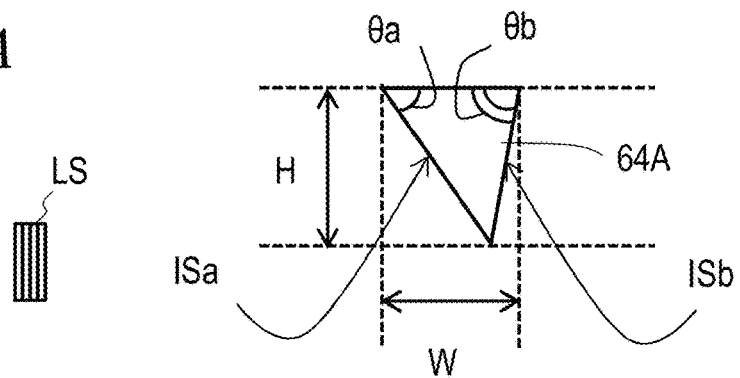
FIG. 3A A schematic cross-sectional view of an internal space 64A that the illumination device 100A may include.
Figure 3B:
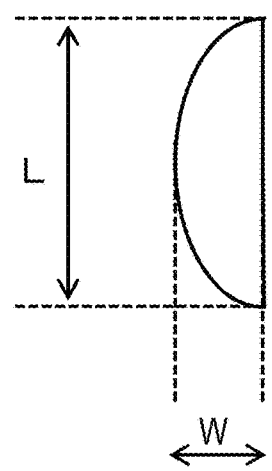
FIG. 3B A schematic plan view of an internal space 64A.
Figure 3C:
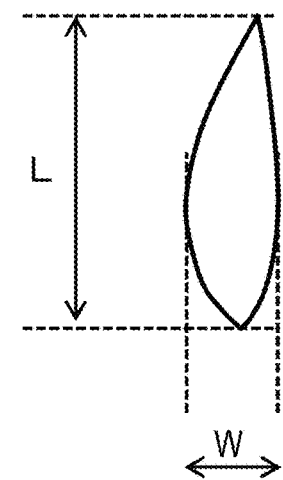
FIG. 3C A schematic plan view showing a variation of an internal space 64A.
Figure 4:
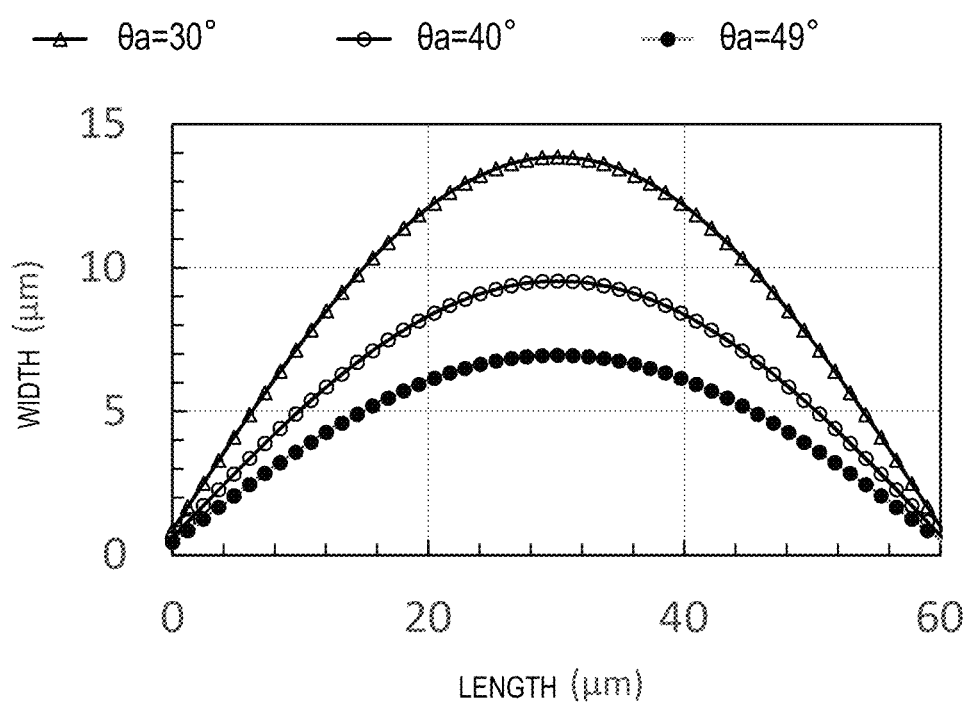
FIG. 4 A graph showing an example shape of the curved surface of a first slope ISa of an internal space 64A.

Next, with reference to FIG. 3A, FIG. 3B, FIG. 3C, and FIG. 4, the shape of an internal space 64A will be described. FIG. 3A is a schematic cross-sectional view of an internal space 64A; FIG. 3B is a schematic plan view of an internal space 64A; and FIG. 3C is a schematic plan view showing a variation of an internal space 64A. FIG. 4 is a graph showing an example shape of the curved surface of the first slope ISa of an internal space 64A.

As shown in FIG. 3A, a cross-sectional shape of an internal space 64A is, for example, a triangle. The sloping angle θa of the first slope ISa that is closer to the light source LS is e.g. not less than 10° and not more than 70°. When the sloping angle θa is less than 10°, there is less controllability of light distribution, and the light extraction efficiency may also decrease. On the other hand, when the sloping angle θa exceeds 70°, it may be difficult to process the textured film, for example. A sloping angle θb of the second slope ISb is e.g. not less than 50° and not more than 100°. When the sloping angle θb is less than 50°, stray light may occur in unintended directions. On the other hand, when the sloping angle θb exceeds 100°, it may be difficult to process the textured film, for example. As shown in FIG. 3B and FIG. 3C, the length L of the internal space 64A is preferably not less than 10 μm and not more than 500 μm, and the width W is preferably not less than 1 μm and not more than 100 μm. The length L is e.g. more than twice the width W. The height H (see FIG. 3A) is preferably not less than 1 μm and not more than 100 μm. Depending on the machining precision when forming a textured film that includes recesses having the planar shape shown in FIG. 3B, recesses having the planar shape shown in FIG. 3C may result. Even in such a case, the length L and the width W can still characterize the planar shape of the internal space.

A curved surface that is convex toward the light source LS of the first slope ISa is expressed by a graph shown in FIG. 4, for example. In Examples 1 to 3, illumination devices were produced having internal spaces 64A such that the first slope ISa presented a curved surface as shown in FIG. 4, where the length L was 60 μm and the sloping angle θa of the first slope ISa was 30°, 40° or 49°. In Examples 1 to 3, the width W was respectively about 13.9 μm, about 9.5 μm, and about 7.0 μm. The curved surfaces shown in FIG. 4 are expressed by quartic curves, for example. The sloping angle θb of the second slope ISb was 85° in all of Examples 1 to 3. The illumination devices of Examples 1 to 3 have substantially the same structure as that of the illumination device 100A shown in FIG. 1. Example 4 is an illumination device of a simplified configuration in which, although using the same textured film as that in Example 3, the base layer 30 and the adhesive layer 54 in FIG. 1 were omitted. While the size (longitudinal direction: light-guiding direction× width direction) of the textured film in the illumination devices of Examples 1 to 3 was about 600 mm×about 700 mm, the size (longitudinal direction: light-guiding direction×width direction) of the textured film in the illumination device of Example 4 was about 170 mm×about 120 mm.

Figure 5:
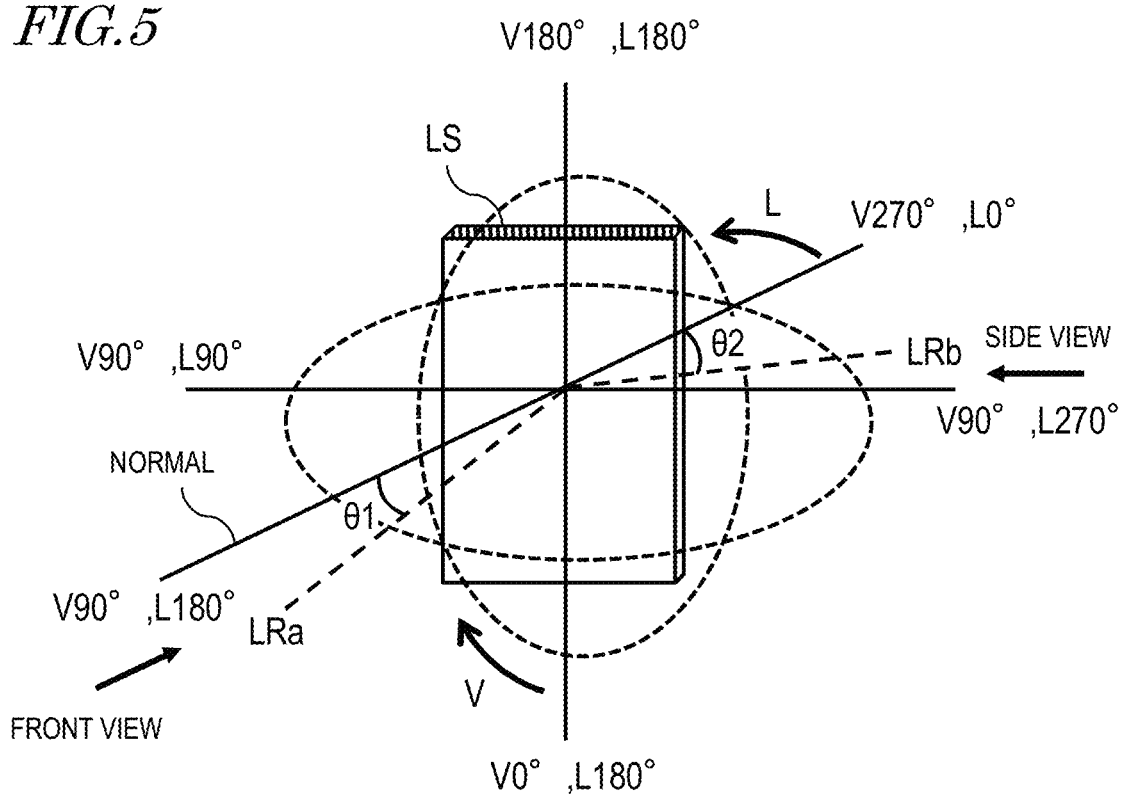
FIG. 5 A diagram showing a coordinate system representing an intensity distribution of outgoing light from the illumination device.

FIG. 5 shows a coordinate system representing a 3D intensity distribution of outgoing light from the illumination device. In each illumination device, the first intensity distribution of the first light emitted from the first exit surface is represented by the polar angle θ1 of the first principal ray from the normal of the first exit surface, and the second intensity distribution of the second light emitted from the second exit surface is represented by the polar angle θ2 of the second principal ray from the normal of the second exit surface. Herein, the first principal ray is defined as a ray having a largest intensity in the first intensity distribution and the second principal ray is defined as a ray having a largest intensity in the second intensity distribution. The intensity distribution of each of the illumination devices of Examples 1 to 3 was measured by using a light distribution measurement apparatus (manufactured by PIMACS CO., LTD., Neolight9500). The intensity distribution of the illumination device of Example 4 was measured by using a light distribution evaluation apparatus (Radiant Conoscope 070 manufactured by Radiant Vision Systems).

In the coordinate system representing the 3D intensity distribution, a front face is defined as the side through which the first light LRa is emitted; a rear face is defined as the side through which the second light LRb is emitted; the longitudinal direction (light-guiding direction) of the lightguide layer reads vertically (top-to-bottom); and the width direction reads horizontally (side-by-side). Then, the intensity distribution as is expressed luminous intensities (luminances) at the respective polar angles in the vertical direction (V direction indicated by arrow V in the figure) and in the horizontal direction (L direction indicated by arrow L in the figure). A polar angle in the V direction may simply be denoted as V, and a polar angle in the L direction may simply be denoted as L.

Figure 6A:
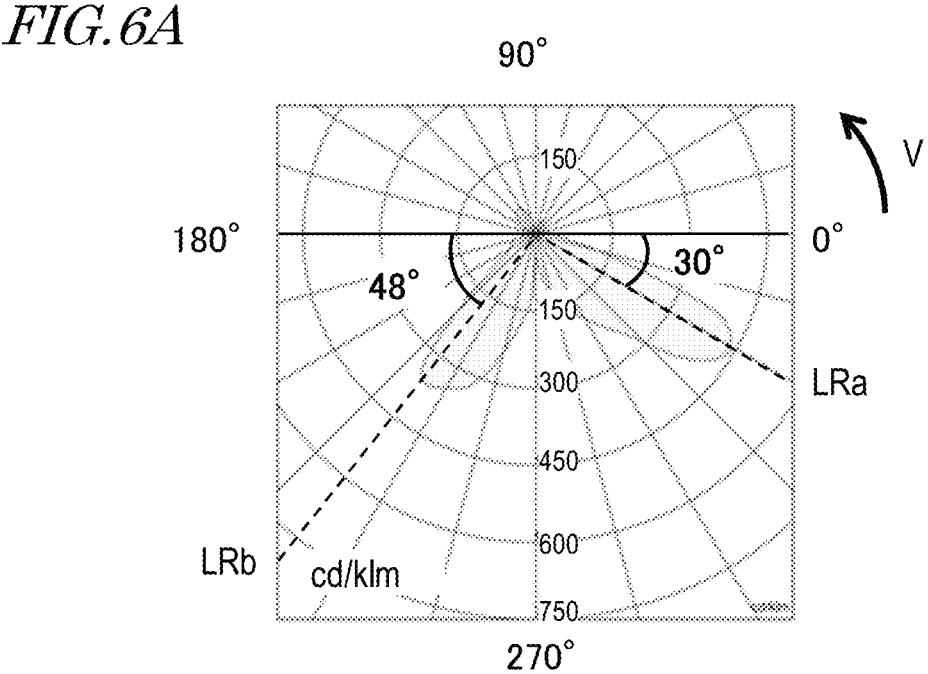
FIG. 6A A diagram showing an intensity distribution of light emitted from an illumination device of Example 1 according to an embodiment of the present invention.
Figure 6B:
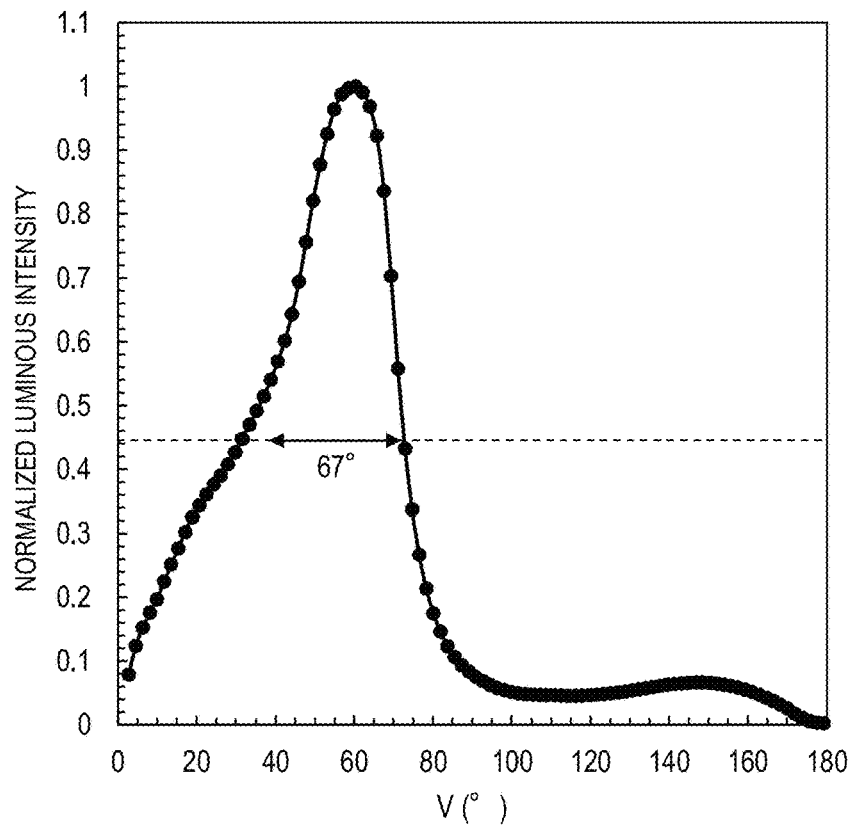
FIG. 6B A graph showing an intensity distribution of light emitted from the illumination device of Example 1 regarding a V direction.
Figure 6C:
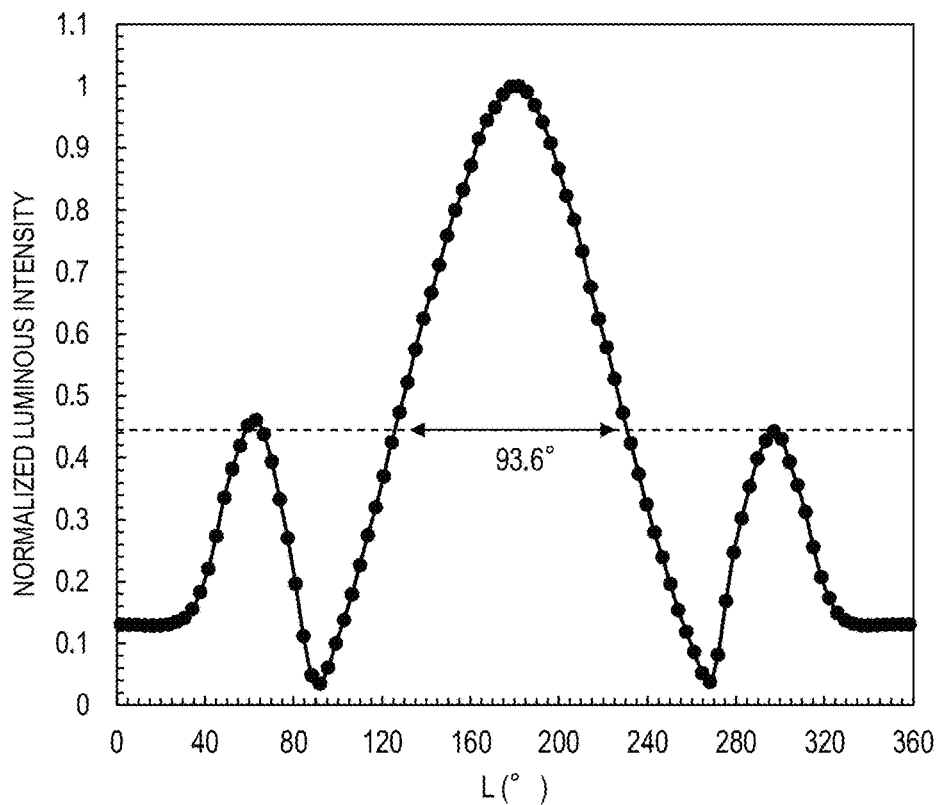
FIG. 6C A graph showing an intensity distribution of light emitted from the illumination device of Example 1 regarding an L direction.
Figure 7A:
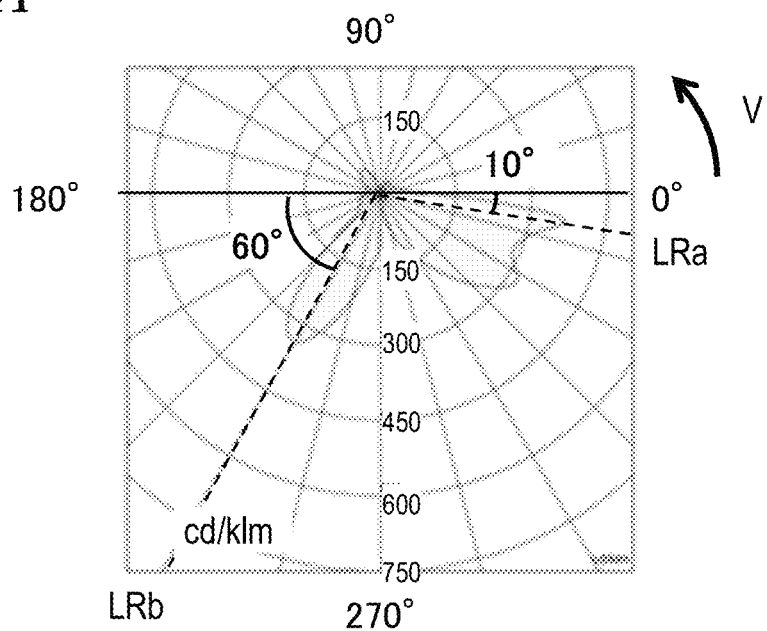
FIG. 7A A diagram showing an intensity distribution of light emitted from an illumination device of Example 2 according to an embodiment of the present invention.
Figure 7B:
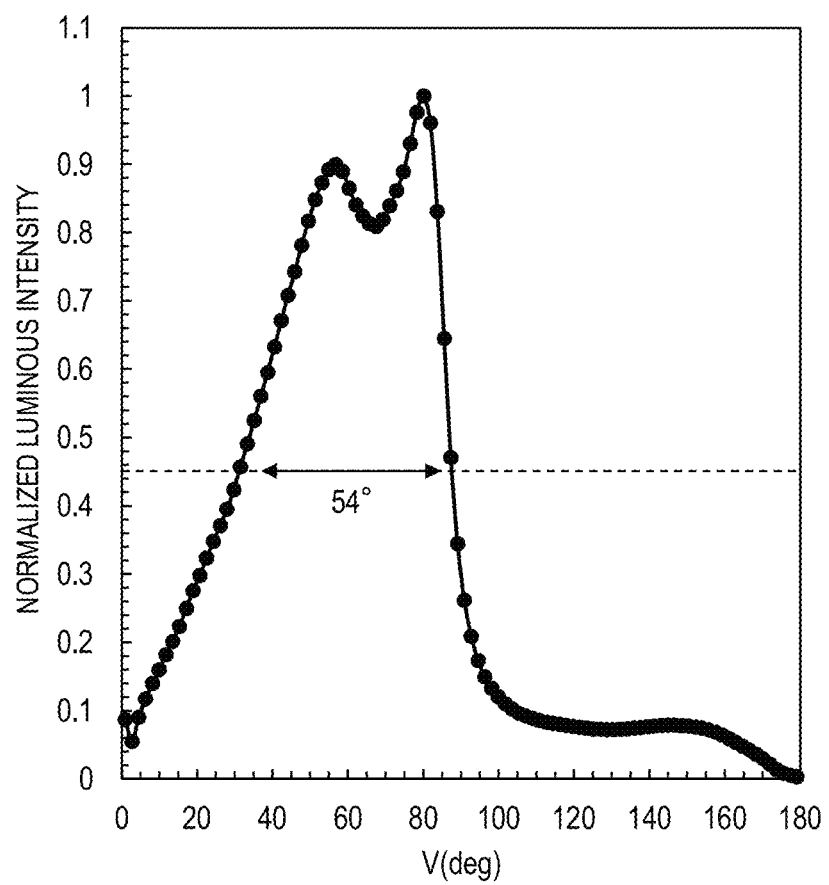
FIG. 7B A graph showing an intensity distribution of light emitted from the illumination device of Example 2 along the V direction.
Figure 7C:
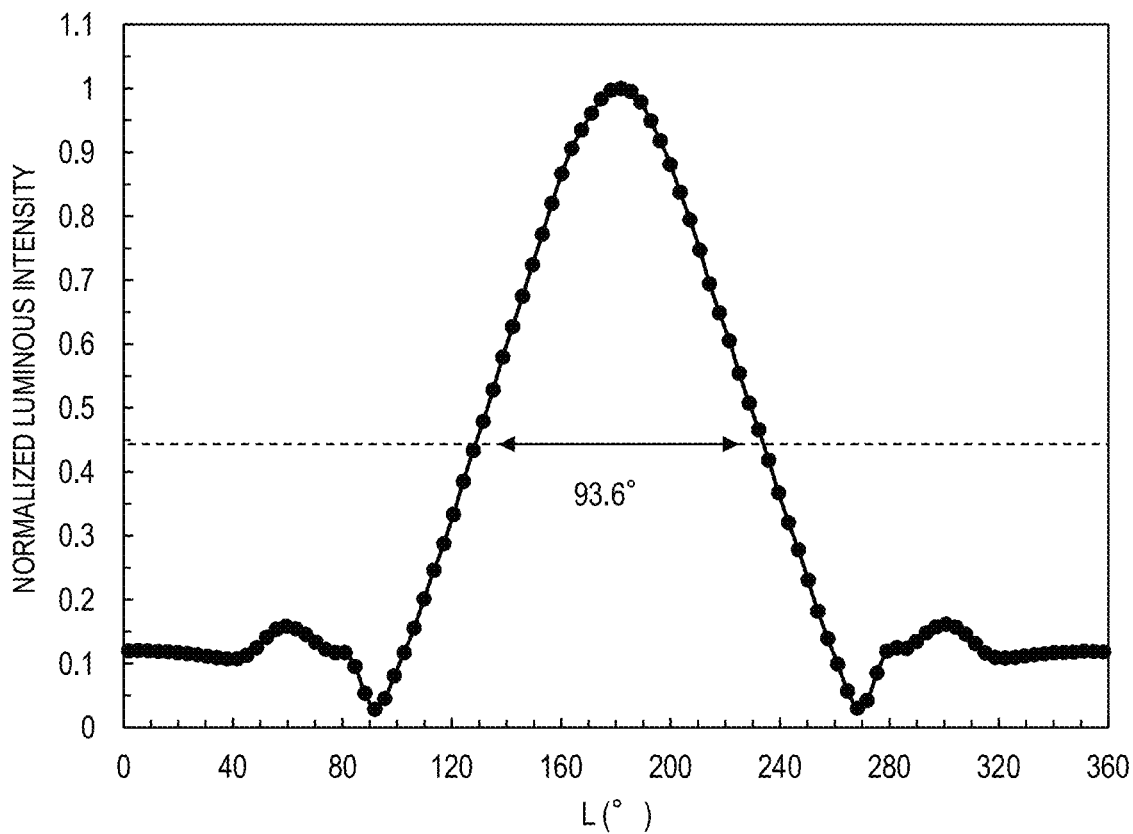
FIG. 7C A graph showing an intensity distribution of light emitted from the illumination device of Example 2 along the L direction.
Figure 8A:
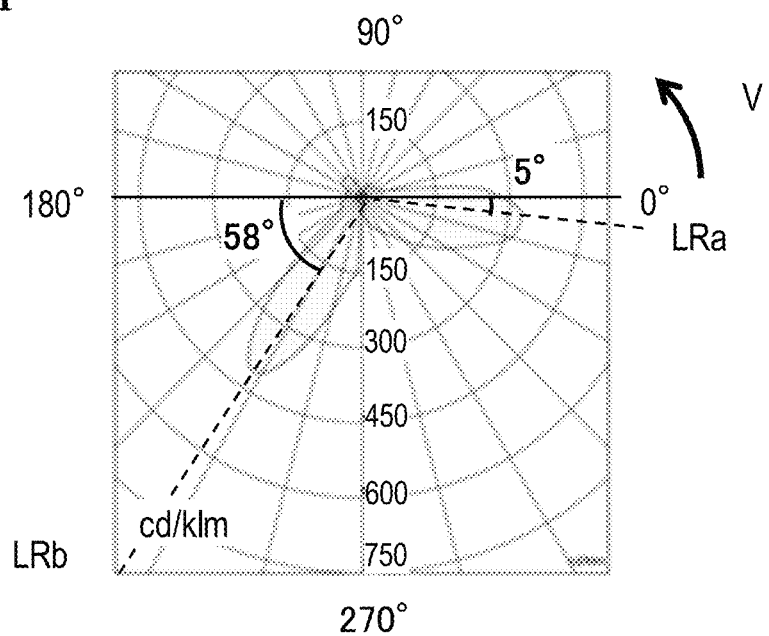
FIG. 8A A diagram showing an intensity distribution of light emitted from an illumination device of Example 3 according to an embodiment of the present invention.
Figure 8B:
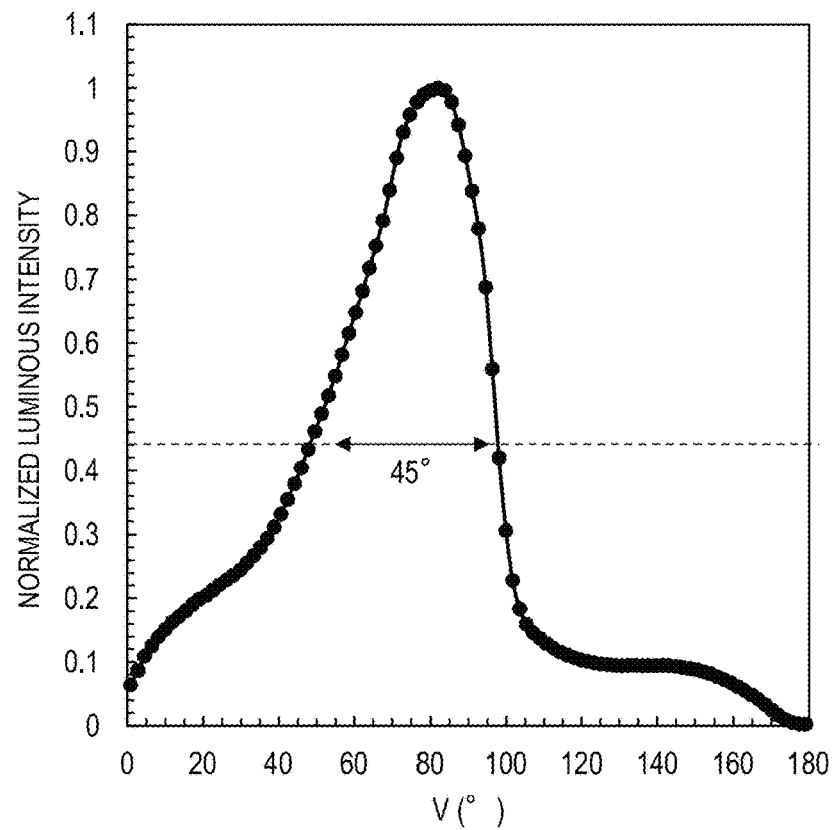
FIG. 8B A graph showing an intensity distribution of light emitted from the illumination device of Example 3 along the V direction.
Figure 8C:
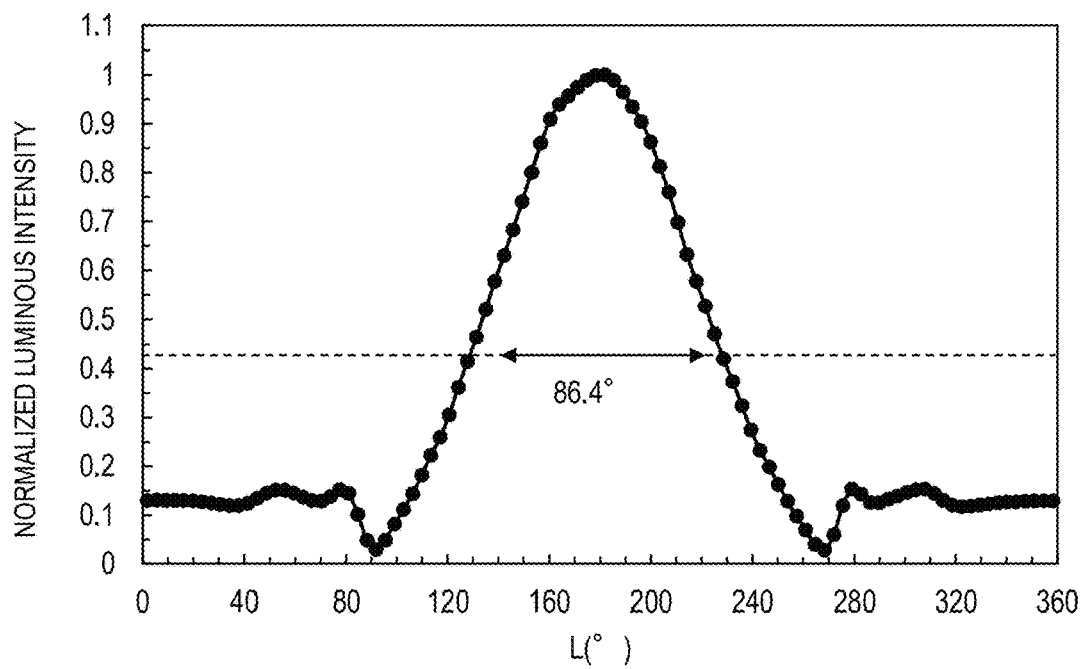
FIG. 8C A graph showing an intensity distribution of light emitted from the illumination device of Example 3 along the L direction.
Figure 8D:
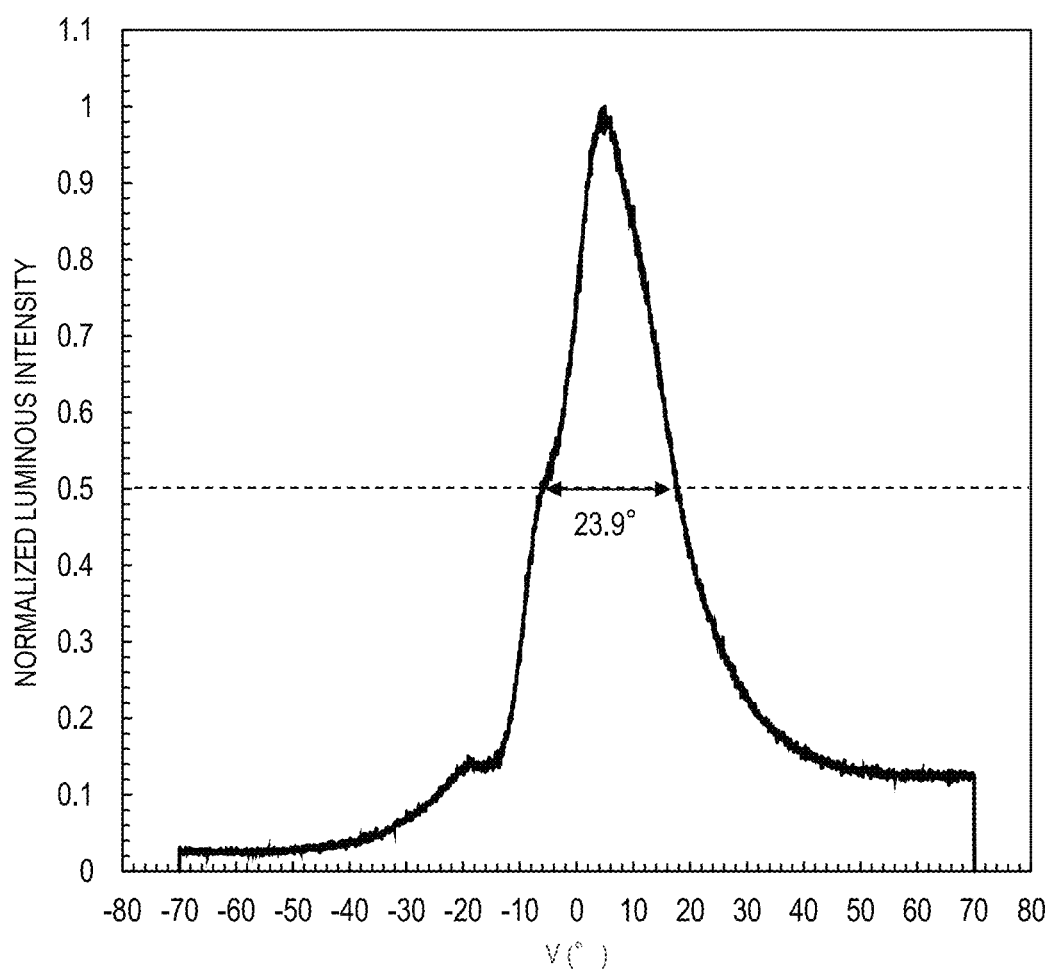
FIG. 8D A graph showing an intensity distribution of light emitted from an illumination device of Example 4 according to an embodiment of the present invention along the V direction.

FIG. 6A shows an intensity distribution of light emitted from the illumination device of Example 1. FIG. 6B is a graph representing an intensity distribution of light emitted from the illumination device of Example 1 along the V direction; and FIG. 6C is a graph representing an intensity distribution of light emitted from the illumination device of Example 1 along the L direction. FIG. 7A shows an intensity distribution of light emitted from the illumination device of Example 2. FIG. 7B is a graph representing an intensity distribution of light emitted from the illumination device of Example 2 along the V direction; and FIG. 7C is a graph representing an intensity distribution of light emitted from the illumination device of Example 2 along the L direction. FIG. 8A shows an intensity distribution light emitted from the illumination device of Example 3. FIG. 8B is a graph representing an intensity distribution light emitted from the illumination device of Example 3 along the V direction; and FIG. 8C is a graph representing an intensity distribution of light emitted from the illumination device of Example 3 along the L direction. FIG. 8D is a graph representing an intensity distribution of light emitted from the illumination device of Example 4 along the V direction.

As can be seen from FIG. 6A, in the intensity distribution of the illumination device of Example 1, the polar angle θ1 is about 30°, and the polar angle θ2 is about 48°. Also as can be seen from FIG. 6B, a half maximum (FWHM) angle along the V direction is about 67°, and a half maximum angle along the L direction is about 94°. As can be seen from FIG. 7A, in the intensity distribution of the illumination device of Example 2, the polar angle θ1 is about 10°, and the polar angle θ2 is about 60°. Also as can be seen from FIG. 7B, a half maximum (FWHM) angle along the V direction is about 54°, and a half maximum angle along the L direction is about 94°. As can be seen from FIG. 8A, in the intensity distribution of the illumination device of Example 3, the polar angle θ1 is about 8°, and the polar angle θ2 is about 58°. Also as can be seen from FIG. 8B, a half maximum (FWHM) angle along the V direction is about 45°, and a half maximum angle along the L direction is about 86°. In the illumination device of any of Examples 1 to 3, the polar angle θ1 of the first principal ray LRa from the normal of the first exit surface is smaller than the polar angle θ2 of the second principal ray LRb from the normal of the second exit surface. Moreover, a sum of the polar angle θ1 and the polar angle θ2 is about 78°, about 70°, or about 63°, which is in the range from about 60° to about 80°. Also as can be seen from FIG. 8D, the half maximum angle along the V direction can be reduced to at least about 24°.

As can be seen from the results of Examples 1 to 3, the half maximum angle of the first light along the V direction is not less than about 45° and not more than about 67°, and the half maximum angle of the second light along the L direction can be controlled to within a range of not less than about 86° and not more than about 94°. Moreover, from the result of Example 4, the lower limit of the half maximum angle of the first light along the V direction can be reduced to at least about 24°.

A ratio of intensity of the first principal ray to intensity of the second principal ray, the aforementioned polar angle θ1, the half maximum angle along the V direction, and the half maximum angle along the L direction in each of the illumination devices of Examples 1 to 4 are shown in Table 1 below. Also shown in Table 1 are: sloping angles θa and θb; and a ratio of the area of the internal spaces to the area of the lightguide layer (internal space occupied area percentage).

TABLE 1

Examples (actually measured)

| | first slope sloping angle $\theta a$ (°) | second slope sloping angle $\theta b$ (°) | intensity ratio first principal ray/second principal ray | internal space occupied area percentage (%) | polar angle $\theta 1$ (°) | half maximum angle V direction (°) | half maximum angle L direction (°) |
|---|---|---|---|---|---|---|---|
| Ex. 1 | 30 | 85 | 1.3 | 3.04 | 30 | 67 | 93.6 |
| Ex. 2 | 40 | 85 | 1.1 | 2.15 | 10 | 54 | 93.6 |
| Ex. 3 | 49 | 85 | 0.9 | 1.20 | 8 | 45 | 86.4 |
| Ex. 4 | 49 | 85 | — | 1.20 | 5 | 24 | — |

In the illumination device of any Example, it can be seen that the value of intensity of the first principal ray/intensity of the second principal ray is in the range of not less than 0.9 and not more than 1.3, such that both sides of the sheet-shaped illumination device can be illuminated. The greater the internal space occupied area percentage is, the greater the ratio of intensity of the first principal ray to intensity of the second principal ray can be. The internal space occupied area percentage was all 5% or less, with a visible light transmittance of 80% or more and a haze value of 5% or less.

Figure 9:
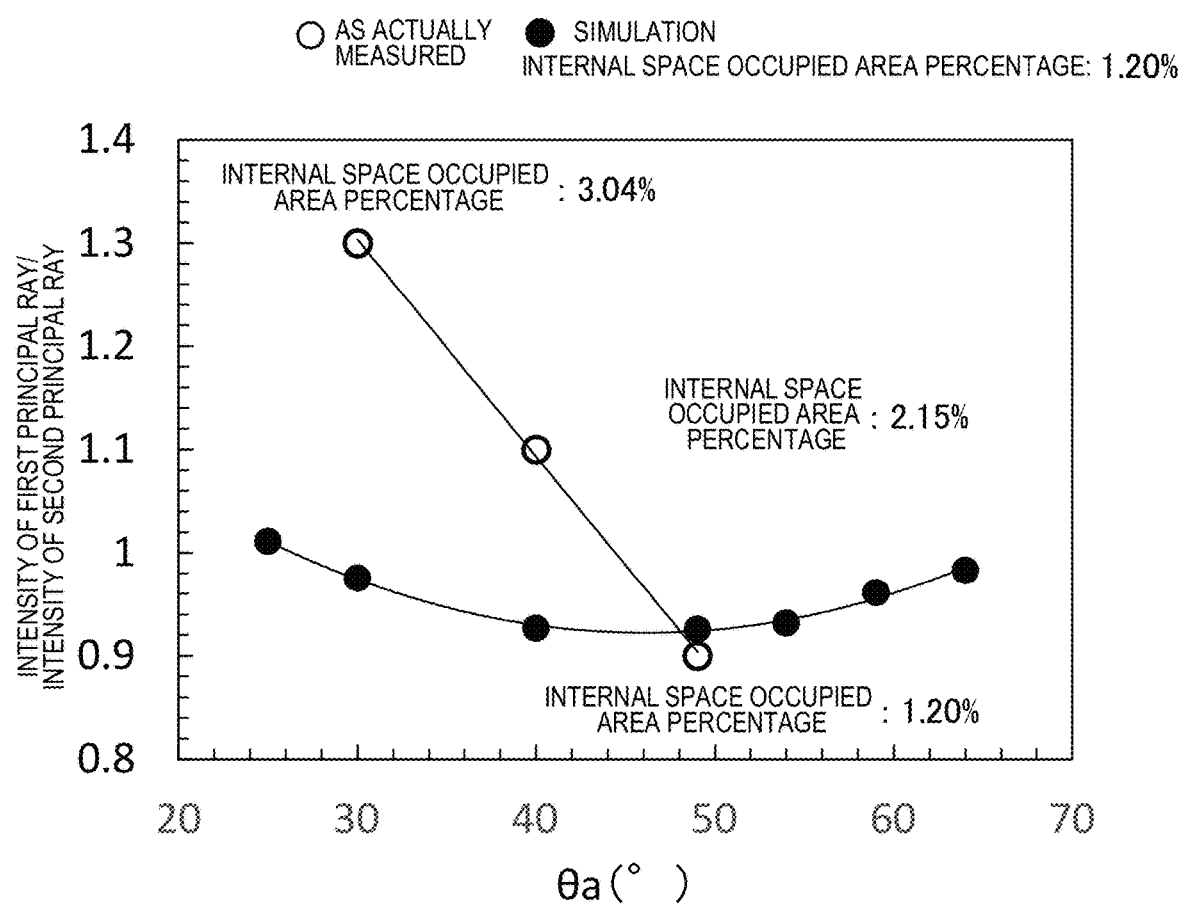
FIG. 9 A graph showing results of determining values of intensity of a first principal ray/intensity of a second principal ray through a simulation, where the sloping angle $\theta a$ of the internal spaces 64A was varied.

Moreover, a simulation was carried out by using Light Tools (manufactured by Synopsys, Inc.), which is a well known piece of lighting design analysis software. FIG. 9 shows results of determining values of intensity of the first principal ray/intensity of the second principal ray through the simulation, where the sloping angle $\theta a$ of the internal spaces 64A was varied, along with actually measurements for Examples 1 to 3. In the simulation, the internal space occupied area percentage was assumed to be 1.20%.

As shown in FIG. 9, the value of intensity of the first principal ray/intensity of the second principal ray of Example 3, whose internal space occupancy is 1.20%, essentially matches the simulation result. According to the simulation results, the value of intensity of the first principal ray/intensity of the second principal ray takes a local minimum at a sloping angle $\theta a$ of about 45°, and increases when the sloping angle $\theta a$ is greater (e.g., about 49° or more) or smaller (e.g., about 40° or less) than about 45°. Therefore, by adjusting the internal space occupancy and the sloping angle $\theta a$, the value of intensity of the first principal ray/intensity of the second principal ray can be varied.

Figure 10:
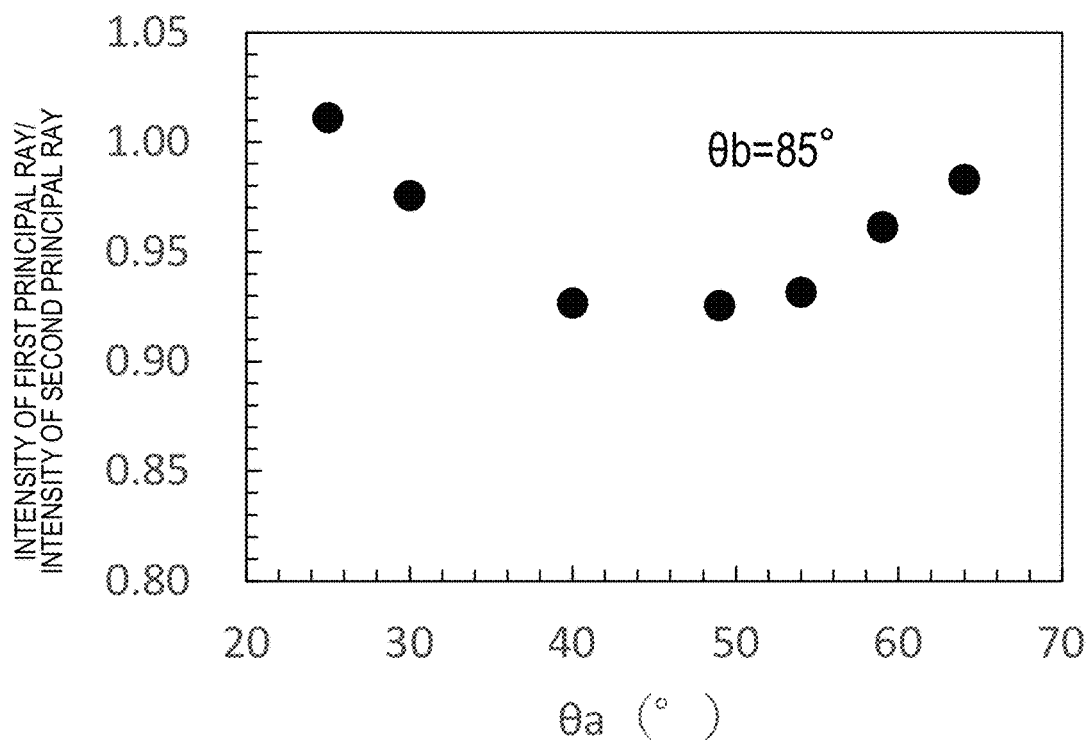
FIG. 10 A graph showing results of determining ratios of intensity of the first principal ray to intensity of the second principal ray through a simulation, where the sloping angle $\theta a$ of the internal spaces 64A of the illumination device of Example 3 was varied.

Results of determining values of intensity of the first principal ray/intensity of the second principal ray through a simulation, where the sloping angle $\theta a$ of the internal spaces 64A of the illumination device of Example 3 was varied, are shown in Table 2 and in FIG. 10.

TABLE 2 simulation results

| first slope sloping angle $\theta a$ (°) | second slope sloping angle $\theta b$ (°) | intensity of first principal ray/intensity of second principal ray | internal space occupied area percentage (%) |
|---|---|---|---|
| 25 | 85 | 1.011 | 1.20 |
| 30 | 85 | 0.976 | 1.20 |
| 40 | 85 | 0.927 | 1.20 |
| 49 | 85 | 0.926 | 1.20 |
| 54 | 85 | 0.932 | 1.20 |
| 59 | 85 | 0.961 | 1.20 |
| 64 | 85 | 0.983 | 1.20 |

Figure 11:
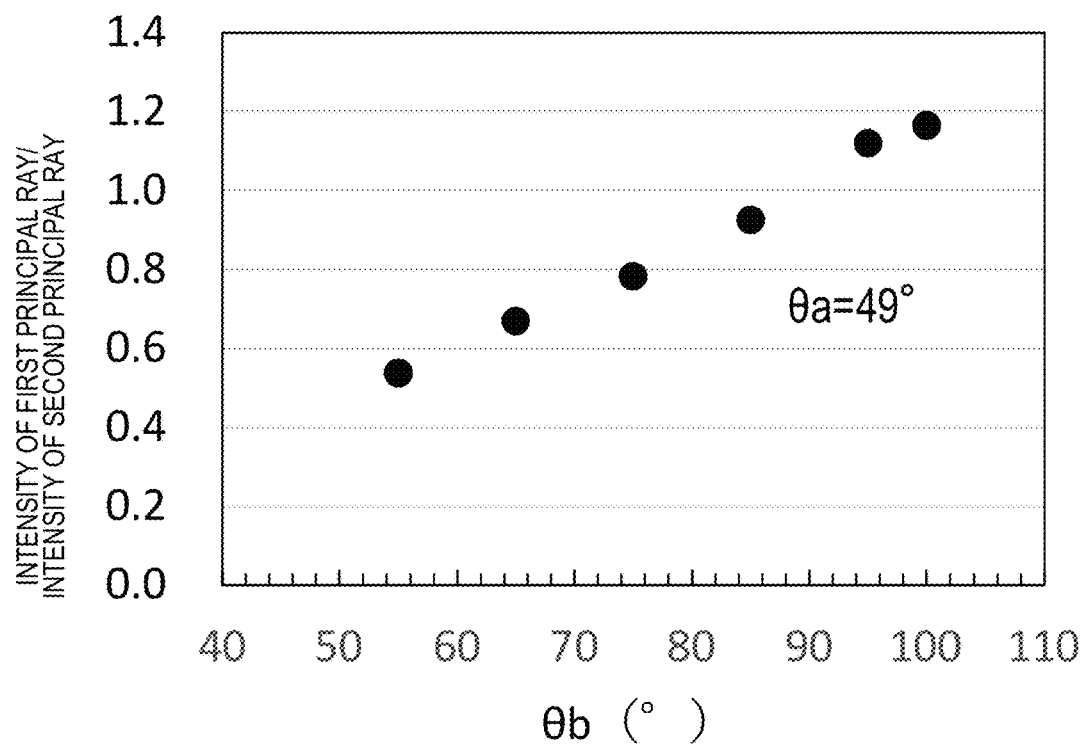
FIG. 11 A graph showing results of determining ratios of intensity of the first principal ray to intensity of the second principal ray through a simulation, where the sloping angle $\theta b$ of the internal spaces 64A of the illumination device of Example 3 was varied.

Also, results of determining ratios of intensity of the first principal ray to intensity of the second principal ray through a simulation, where the sloping angle $\theta b$ of the internal spaces 64A of the illumination device of Example 3 was varied, are shown in FIG. 11. In the simulation, the internal space occupied area percentage was assumed to be 1.20%. As can be seen from Table 2, FIG. 10, and FIG. 11, by changing the sloping angles $\theta a$ and $\theta b$, the value of intensity of the first principal ray/intensity of the second principal ray can be adjusted within a range from 0.5 to 1.3. Furthermore, by adopting a configuration described later with reference to FIG. 18A and FIG. 18B, where a light absorbing layer is provided on the light-incident side, the intensity of the first principal ray: the intensity of the second principal ray can be controlled to within a range from 1:4 to 4:1.

Figure 12:
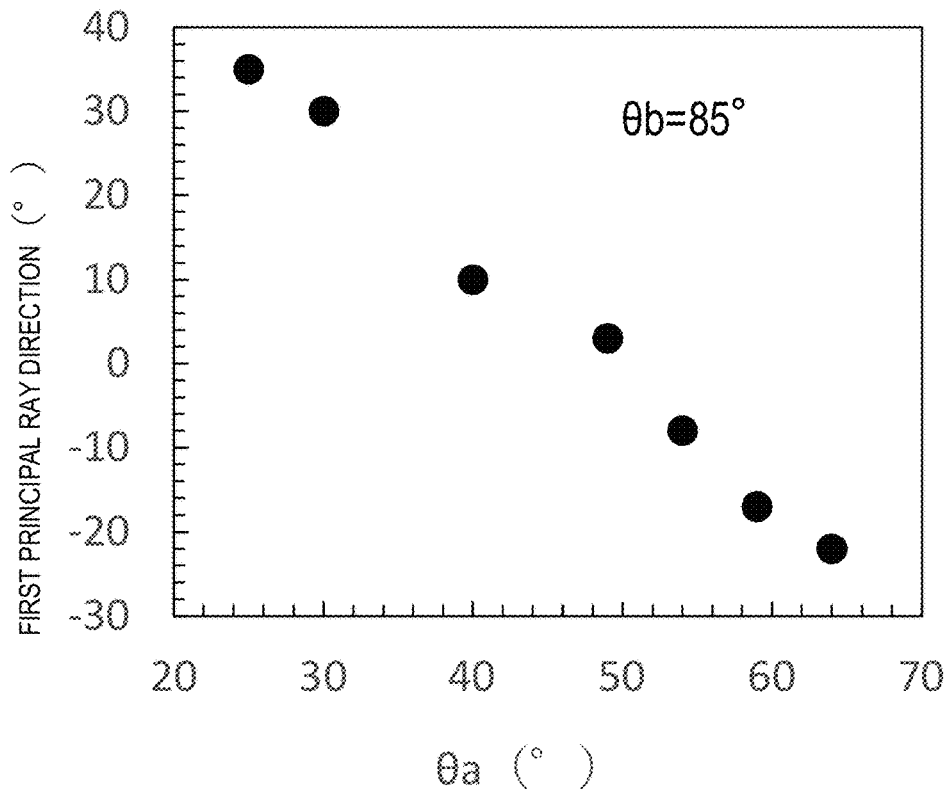
FIG. 12 A graph showing first principal ray directions (polar angle $\theta 1$), where the sloping angle $\theta a$ of the internal spaces 64A of the illumination device of Example 3 was varied.
Figure 13:
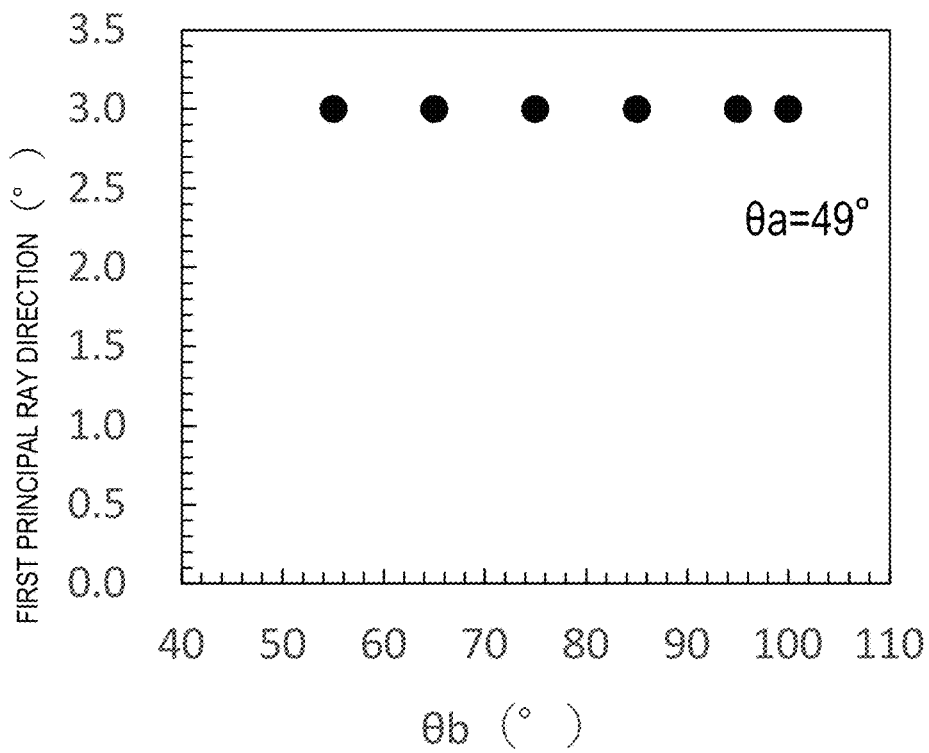
FIG. 13 A graph showing first principal ray directions (polar angle $\theta 1$), where the sloping angle $\theta b$ of the internal spaces 64A of the illumination device of Example 3 was varied.

Moreover, first principal ray directions (polar angle $\theta 1$) obtained by varying the sloping angle $\theta a$ of the internal spaces 64A of the illumination device of Example 3 are shown in FIG. 12, and first principal ray directions (polar angle $\theta 1$) obtained by varying the sloping angle $\theta b$ are shown in FIG. 13. As can be seen from FIG. 12, by changing the sloping angle $\theta a$, the first principal ray direction (polar angle $\theta 1$) can be varied. On the other hand, as can be seen from FIG. 13, the sloping angle $\theta b$ does not affect the first principal ray direction (polar angle $\theta 1$).

Figure 14:
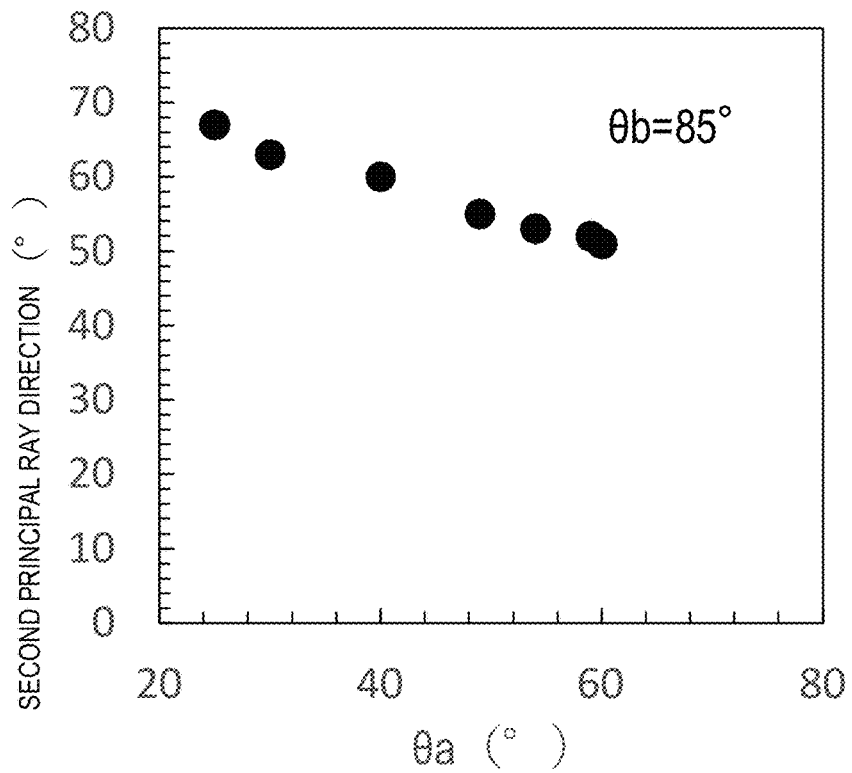
FIG. 14 A graph showing second principal ray directions (polar angle $\theta 2$), where the sloping angle $\theta a$ of the internal spaces 64A of the illumination device of Example 3 was varied.
Figure 15:
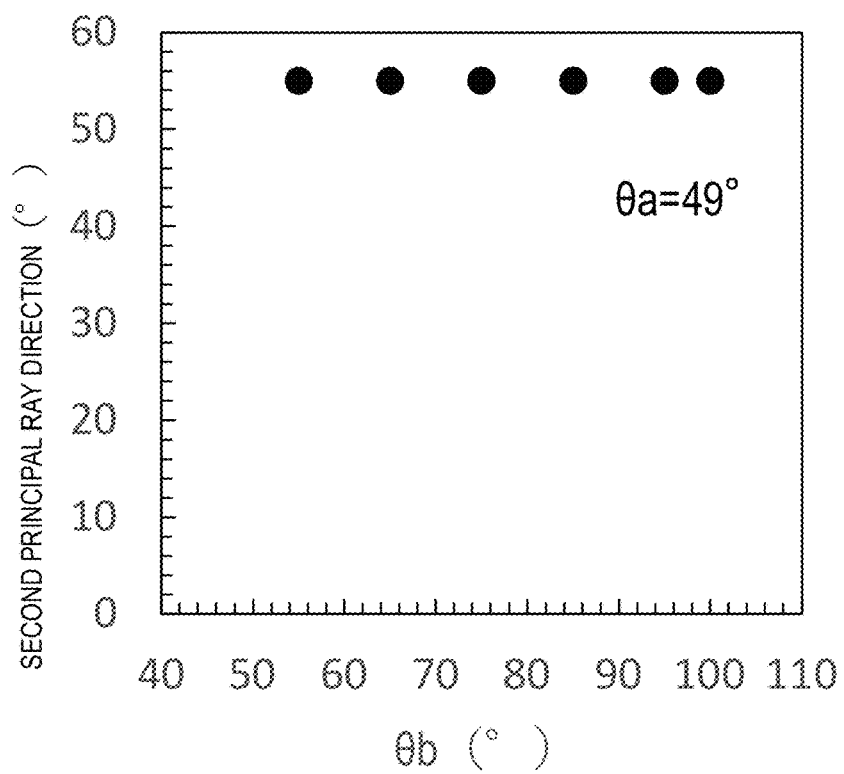
FIG. 15 A graph showing second principal ray directions (polar angle $\theta 2$), where the sloping angle $\theta b$ of the internal spaces 64A of the illumination device of Example 3 was varied.

Moreover, second principal ray directions (polar angle $\theta 2$) obtained by varying the sloping angle $\theta a$ of the internal spaces 64A of the illumination device of Example 3 are shown in FIG. 14, and second principal ray directions (polar angle $\theta 2$) obtained by varying the sloping angle $\theta b$ are shown in FIG. 15. As can be seen from FIG. 14, by changing the sloping angle $\theta a$, the second principal ray direction (polar angle $\theta 2$) can be varied. On the other hand, as can be seen from FIG. 15, the sloping angle $\theta b$ does not affect the second principal ray direction (polar angle $\theta 2$).

As described above, by adjusting the internal space occupied area percentage and the sloping angles $\theta a$ and $\theta b$, the intensity distribution of the outgoing light from the illumination device can be adjusted. For example, while the sloping angle $\theta b$ does not affect the directions (polar angles $\theta 1$ and $\theta 2$) of the principal rays, it almost linearly affects the ratio between the intensity of the first principal ray and the intensity of the second principal ray (see FIG. 11). Therefore, once the internal space occupied area percentage and the sloping angle $\theta a$ are determined, by changing the sloping angle $\theta b$, the ratio between the intensity of the first principal ray and the intensity of the second principal ray can be adjusted.

The lightguide components for illumination devices and illumination devices according to embodiments of the present invention are not limited to the above examples, but may be modified in various manners. Similarly to the illumination device 100A shown in FIG. 1, illumination devices 100As, 100A2, 100A3 and 100A4 shown in FIG. 16A, FIG. 16B, FIG. 16C and FIG. 16D are examples of illumination devices that include lightguide components 100A1(G), 100A2(G), 100A3(G) and 100A4(G) for illumination devices having a light distribution controlling structure (i.e., a plurality of internal spaces 64A) configured so that the first exit surface faces downward.

Figure 16A:
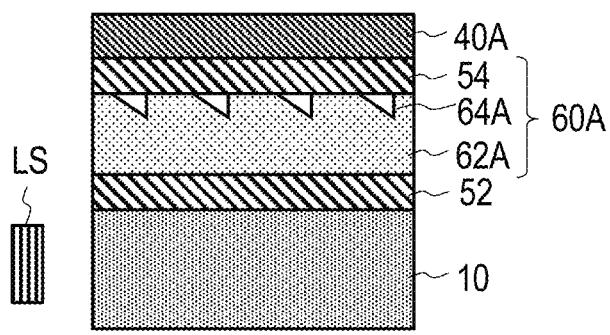
FIG. 16A A schematic cross-sectional view of another illumination device 100A1 according to an embodiment of the present invention.

The lightguide component 100A1(G) for illumination devices of the illumination device 100A1 shown in FIG. 16A includes an anti-reflection layer 40A, instead of the base layer 30 of the lightguide component 100A(G) for illumination devices of the illumination device 100A shown in FIG. 1. Instead of the anti-reflection layer 40A, a hard coat layer (having a pencil hardness of H or higher, for example) may be provided, or an anti-reflection layer and a hard coat layer may be provided. An anti-reflection layer and/or a hard coat layer may be provided on the first principal face (lower side) of the lightguide layer 10. The anti-reflection layer and the hard coat layer can be formed by a known method by using a known material. These are also true of any other illumination device illustrated herein.

Figure 16B:
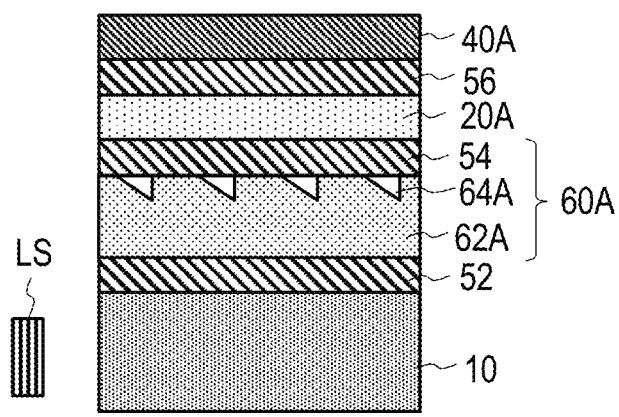
FIG. 16B A schematic cross-sectional view of still another illumination device 100A2 according to an embodiment of the present invention.

The lightguide component 100A2(G) for illumination devices of the illumination device 100A2 shown in FIG. 16B further includes a low-refractive index layer 20A at the second exit surface side of the redirection layer 60A. Providing the low-refractive index layer 20A allows an interface to be created between the redirection layer 60A and the low-refractive index layer 20A that is capable of causing total reflection of light; therefore, even if dirt, dents, scratches, or other defects exist on the surface at the second exit surface side of the lightguide component, the optical performance of the lightguide component may be less affected by such defects. Moreover, as in the lightguide component 100A3(G) illumination for devices of the illumination device 100A3 shown in FIG. 16C, a low-refractive index layer 20B may be provided on the first principal face (lower side) of the lightguide layer 10. Furthermore, as in the lightguide component 100A4(G) for illumination devices of the illumination device 100A4 shown in FIG. 16D, a low-refractive index layer 20A may be provided at the second exit surface side of the redirection layer 60A, and a low-refractive index layer 20B may be provided on the first principal face (lower side) of the lightguide layer 10. When providing an anti-reflection layer, a hard coat layer, or a low-refractive index layer, an adhesive layer 52, 55, 56 or 58 may be provided as appropriate.

Next, illumination devices 100B1, 100B2, 100B3 and 100B4 shown in FIG. 17A, FIG. 17B, FIG. 17C and FIG. 17D illustrate examples of illumination devices that include lightguide components 100B1(G), 100B2(G), 100B3(G) and 100B4(G) for illumination devices having a light distribution controlling structure (i.e., a plurality of internal spaces 64B) configured so that the first exit surface faces upward, unlike the illumination device 100A shown in FIG. 1.

Figure 17A:
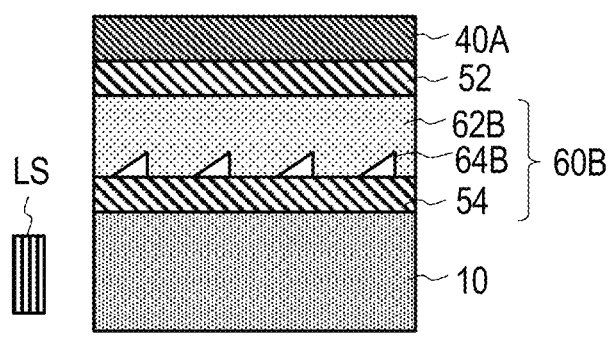
FIG. 17A A schematic cross-sectional view of still another illumination device 100B1 according to an embodiment of the present invention.

The lightguide component 100B1(G) for illumination devices of the illumination device 100B1 shown in FIG. 17A includes a redirection layer 60B having a light distribution controlling structure (i.e., a plurality of internal spaces 64B) configured so that the first exit surface faces upward. The redirection layer 60B is constituted by an adhesive layer 54 and a textured film 62B having recesses 64B (indicated by the same reference numeral as the internal spaces 64B) on its surface. The light distribution controlling structure may be created within the lightguide layer 10. The illumination device 100B1 has an anti-reflection layer 40A at the first exit surface side of the redirection layer 60B. Instead of an anti-reflection layer 40A, a hard coat layer (having a pencil hardness H or higher, for example) may be provided, or an anti-reflection layer and a hard coat layer may be provided.

Figure 17B:
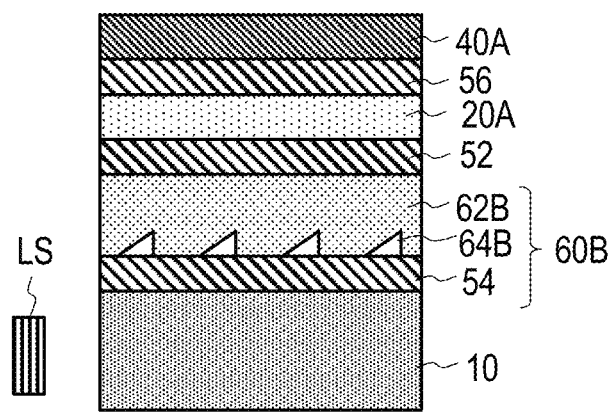
FIG. 17B A schematic cross-sectional view of still another illumination device 100B2 according to an embodiment of the present invention.
Figure 17C:
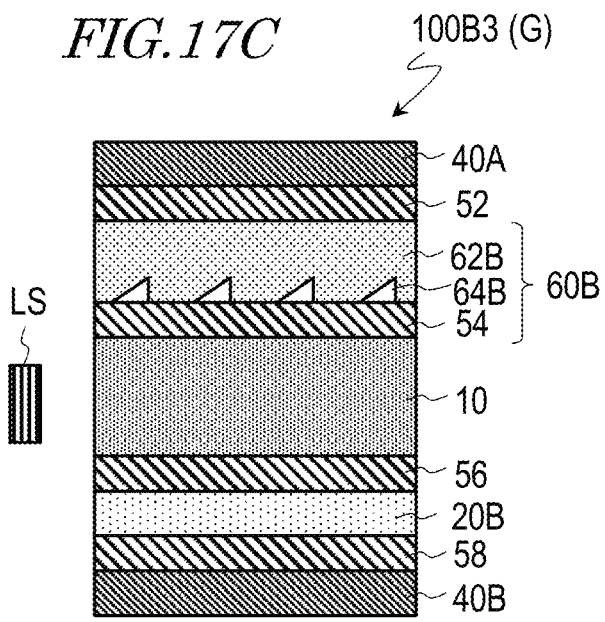
FIG. 17C A schematic cross-sectional view of still another illumination device 100B3 according to an embodiment of the present invention.
Figure 17D:
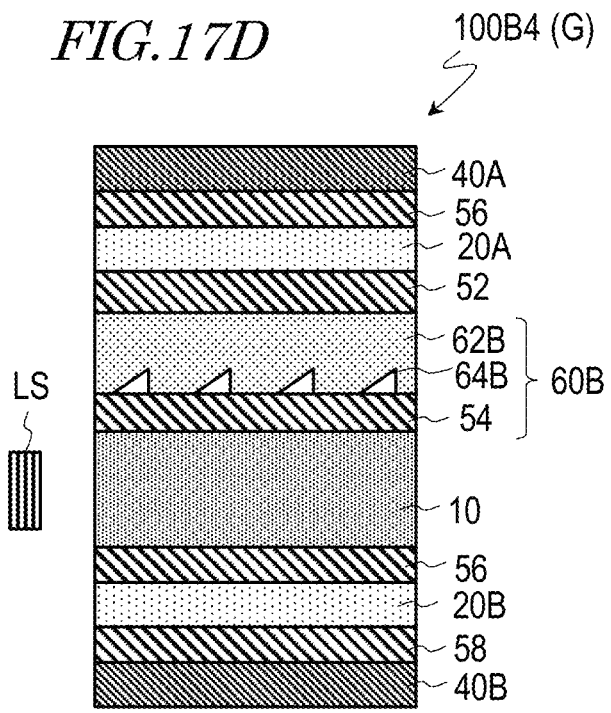
FIG. 17D A schematic cross-sectional view of still another illumination device 100B4 according to an embodiment of the present invention.

The lightguide component 100B2(G) for illumination devices of the illumination device 100B2 shown in FIG. 17B further includes a low-refractive index layer 20A at the first exit surface side of the redirection layer 60B. Providing the low-refractive index layer 20A allows an interface to be created between the redirection layer 60B and the low-refractive index layer 20A that is capable of causing total reflection of light; therefore, even if dirt, dents, scratches, or other defects exist on the surface at the first exit surface side of the lightguide component, the optical performance of the lightguide component may be less affected by such defects. Moreover, as in the lightguide component 100B3(G) for illumination devices of the illumination device 100B3 shown in FIG. 17C, a low-refractive index layer 20B may be provided on the second principal face (lower side) of the lightguide layer 10. Furthermore, as in the lightguide component 100B1(G) for illumination devices of the illumination device 100B4 shown in FIG. 17D, a low-refractive index layer 20A may be provided at the first exit surface side of the redirection layer 60B and a low-refractive index layer 20B may be provided on the second principal face (lower side) of the lightguide layer 10.

Figure 18A:
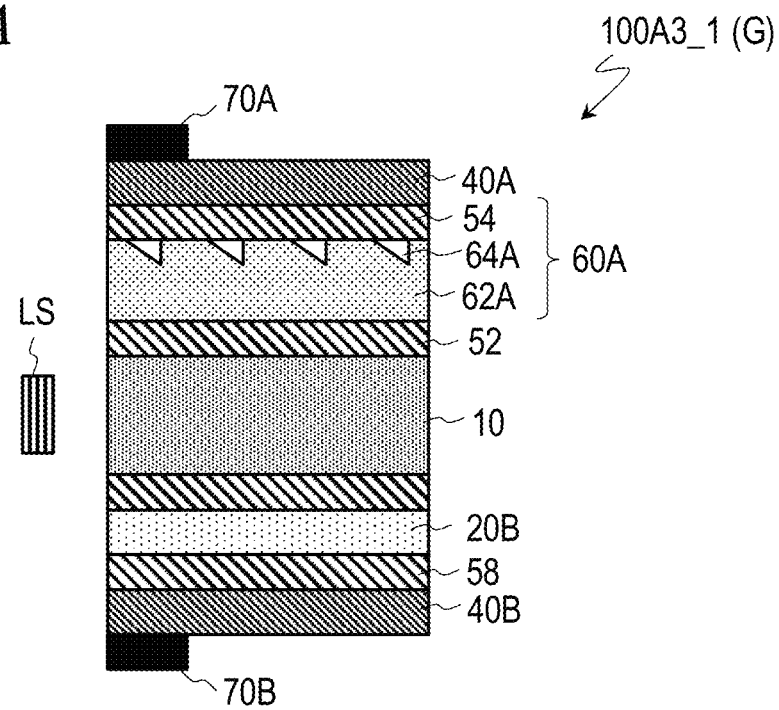
FIG. 18A A schematic cross-sectional view of still another illumination device 100A3_1 according to an embodiment of the present invention.
Figure 18B:
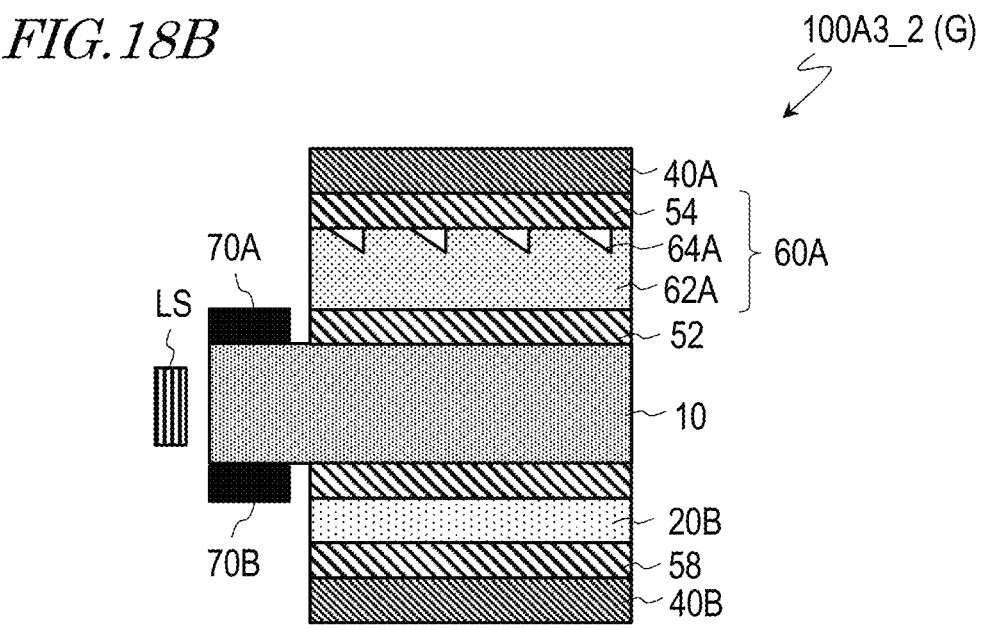
FIG. 18B A schematic cross-sectional view of still another illumination device 100A3_2 according to an embodiment of the present invention.

An illumination device according to an embodiment of the present invention may be further modified as follows. FIG. 18A shows a schematic cross-sectional view of still another illumination device 100A3_1 according to an embodiment of the present invention, and FIG. 18B shows a schematic cross-sectional view of still another illumination device 100A3_2 according to an embodiment of the present invention. The illumination device 100A3_1 and the illumination device 100A3_2 are example modifications of the illumination device 100A3 shown in FIG. 16C. Any other illumination device described above may also be similarly modified.

Figure 16C:
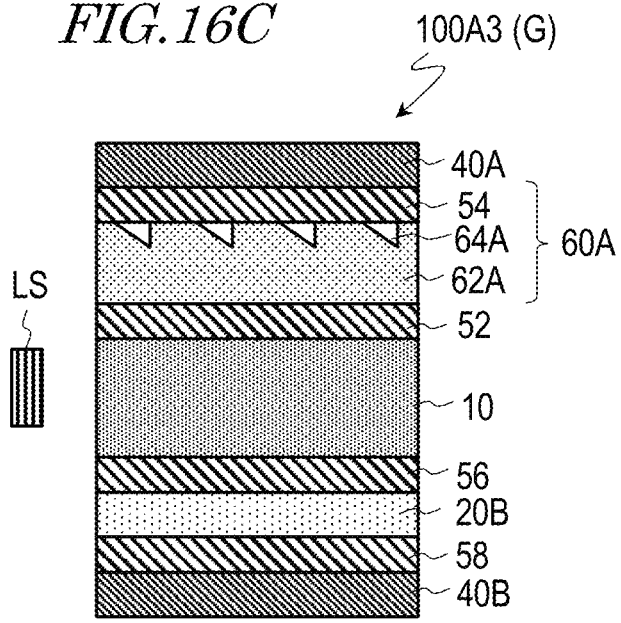
FIG. 16C A schematic cross-sectional view of still another illumination device 100A3 according to an embodiment of the present invention.
Figure 16D:
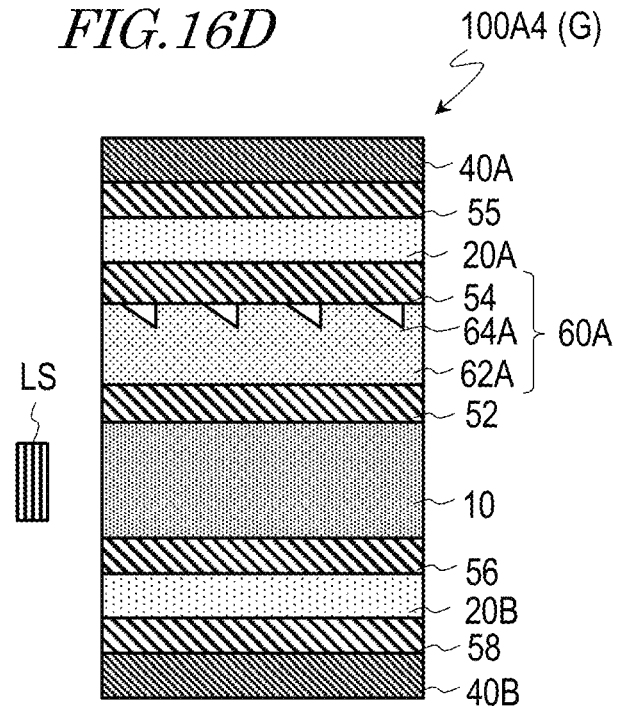
FIG. 16D A schematic cross-sectional view of still another illumination device 100A4 according to an embodiment of the present invention.

A lightguide component 100A3_1(G) for illumination devices of the illumination device 100A3_1 shown in FIG. 18A has light absorbing layers 70A and 70B at an end of the upper and lower exit surfaces (first and second exit surfaces) of the lightguide component 100A3(G) for illumination devices of the illumination device 100A3 shown in FIG. 16C that is closer to the light source LS. The light absorbing layers 70A and 70B are layers that absorb visible light and present a black color, and may be black adhesive tape, for example. The light absorbing layers 70A and 70B have a width of e.g. about 10 mm from the light source LS side, and are provided along a light-receiving portion of the lightguide component 100A3_1(G) for illumination devices (for example, along a shorter side of the lightguide component 100A(G) for illumination devices as shown in FIG. 2).

The lightguide component 100A3_1(G) for illumination devices of the illumination device 100A3_1 shown in FIG. 18A has light absorbing layers 70A and 70B at an end of the first exit surface and second exit surface (upper and lower exit surfaces) of the lightguide component 100A3(G) for illumination devices of the illumination device 100A3 shown in FIG. 16C that is closer to the light source LS. The light absorbing layers 70A and 70B are layers that absorb visible light and present a black color, and may be black adhesive tape, for example. The light absorbing layers 70A and 70B have a width of e.g. about 10 mm from the light source LS side, and are provided along a light-receiving portion of the lightguide component 100A3_1(G) for illumination devices (for example, along a shorter side of the lightguide component 100A (G) for illumination devices shown in FIG. 2).

The light absorbing layers 70A and 70B absorb a portion of light that enters the lightguide layer 10 from the light source LS. The light absorbed by the light absorbing layers 70A and 70B includes light that would, without the light absorbing layers 70A and 70B, undergo total reflection near the end of the first exit surface and second exit surface (interfaces with air) of the lightguide component 100A3_1 (G) for illumination devices that is closer to the light source LS, and return to the lightguide component 100A3_1(G) for illumination devices. Therefore, by providing the light absorbing layers 70A and 70B and adjusting their width, it becomes possible to restrict the incident angles of light propagating in the lightguide component 100A3_1(G) for illumination devices with respect to the first exit surface and second exit surface. As a result, for example, the intensity of the first principal ray: the intensity of the second principal ray can be controlled to within a range from 1:4 to 4:1. Note that only one of the light absorbing layers 70A and 70B may be provided, and the width of the light absorbing layer (s) 70A and/or 70B may be set each independently as appropriate.

A lightguide component 100A3_2(G) for illumination devices of the illumination device 100A3_2 shown in FIG. 18B includes exposed portions of the first principal face and second principal face at an end of the lightguide layer 10 of the lightguide component 100A3(G) for illumination devices of the illumination device 100A3 shown in FIG. 16C that is closer to the light source LS, such that light absorbing layers 70A and 70B are provided on the exposed first principal face and second principal face. The light absorbing layers 70A and 70B absorb a portion of light that enters the lightguide layer 10 from the light source LS. The light absorbed by the light absorbing layers 70A and 70B includes light that would, without the light absorbing layers 70A and 70B, undergo total reflection at the exposed first surface and second surface (interface with air) of the lightguide layer 10 and propagate in the lightguide layer 10. Therefore, by providing the light absorbing layers 70A and 70B and adjusting their width, it becomes possible to restrict the incident angles of the light propagating in the lightguide layer 10 with respect to the first principal face and the second principal face of the lightguide layer 10. As a result, for example, the intensity of the first principal ray: the intensity of the second principal ray can be controlled to within a range from 1:4 to 4:1. Note that only one of the light absorbing layers 70A and 70B may be provided, and the width of the light absorbing layer (s) 70A and/or 70B may be set each independently as appropriate.

Although omitted from illustration in FIG. 16A to FIG. 16D, FIG. 17A to FIG. 17D, FIG. 18A and FIG. 18B, the low-refractive index layers 20A and 20B and the hard coat layers and/or anti-reflection layers 40A and 40B each have a base layer at an adhesive layer side thereof. The base layers serve to support the low-refractive index layer and the hard coat layers and/or anti-reflection layers, respectively. The base layers each independently have a thickness of e.g. not less than 1 μm and not more than 1000 μm, preferably not less than 10 μm and not more than 100 μm, and still more preferably not less than 20 μm and not more than 80 μm. The base layers each independently have a refractive index of preferably not less than 1.40 and not more than 1.70, and still more preferably not less than 1.43 and not more than 1.65. The base layers are acrylic films, for example.

Preferable examples of the respective component elements of an illumination device according to an embodiment of the present invention will be described.

The textured film for creating the internal spaces may be produced as follows, for example. A concavo-convex textured film was produced according to a method described in Japanese National Phase PCT Laid-Open Publication No. 2013-524288. Specifically, the surface of a polymethyl methacrylate (PMMA) film was coated with a lacquer (manufactured by Sanyo Chemical Co., FINECURE RM-64); an optical pattern was embossed on the film surface including the lacquer; and thereafter the lacquer was cured to produce the concavo-convex textured film of interest. The concavo-convex textured film had a total thickness of 130 μm.

The lightguide layer 10 is made of a known material having a high transmittance with respect to visible light. The lightguide layer 10 is made of an acrylic resin such as polymethyl methacrylate (PMMA), a polycarbonate (PC)-based resin, a cycloolefin-based resin, or glass (e.g., quartz glass, non-alkaline glass, borosilicate glass), for example. The refractive index $n_{GP}$ of the lightguide layer 10 is e.g. not less than 1.40 and not more than 1.80. Unless otherwise specified, the refractive index refers to a refractive index that is measured with an ellipsometer at a wavelength of 550 nm. The thickness of the lightguide layer 10 can be appropriately set depending on the application. The thickness of the lightguide layer 10 is e.g. not less than 0.05 mm and not more than 50 mm.

The base layer has a thickness of e.g. not less than 1 μm and not more than 1000 μm, preferably not less than 10 μm and not more than 100 μm, and still more preferably not less than 20 μm and not more than 80 μm. The base layer has a refractive index of each independently preferably not less than 1.40 and not more than 1.70, and still more preferably not less than 1.43 and not more than 1.65.

The adhesive layers 52, 54, 55, 56 and 58 each independently have a thickness of e.g. not less than 0.1 μm and not more than 100 μm, preferably not less than 0.3 μm and not more than 100 μm, and still more preferably not less than 0.5 μm and not more than 50 μm. The adhesive layers 52, 54, 55, 56 and 58 each independently have a refractive index of preferably not less than 1.42 and not more than 1.60, and more preferably not less than 1.47 and not more than 1.58. The refractive indices of the adhesive layers 52, 54, 56 and 58 are preferably close to the refractive index of the lightguide layer 10 or the textured film 62A or 62B which they are in contact with, and preferably the absolute value of the refractive index difference is 0.2 or less.

Preferably, the adhesive layer 54 is able to achieve bonding without burying the recesses 64A or 64B in the surface of the textured film 62A or 62B. As an adhesive that is suitable for the formation of the adhesive layer 54, adhesives that are described in International Application PCT/JP2021/006452, International Application PCT/JP2021/006453, or Japanese Patent Application No. 2021-025496 by the Applicant can be suitably used. The entire disclosure of these applications is incorporated herein by reference. Particularly preferable is the polyester-based adhesive described in Japanese Patent Application No. 2021-025496.

The low-refractive index layers 20A and 20B each independently have a refractive index $n_{L1}$ of preferably e.g. 1.30 or less, more preferably 1.20 or less, and still more preferably 1.15 or less. The low-refractive index layers 20A and 20B are preferably a solid, preferably having a refractive index of e.g. 1.05 or more. The differences between the refractive index of the lightguide layer 10 and the refractive indices of the low-refractive index layers 20A and 20B are preferably 0.20 or more, more preferably 0.23 or more, and still more preferably 0.25 or more. Low-refractive index layers 20A and 20B having a refractive index of 1.30 or less can be formed by using a porous material, for example. The low-refractive index layer layers 20A and 20B each independently have a thickness of e.g. not less than 0.3 μm and not more than 5 μm.

When the low-refractive index layer is a porous material with internal voids, its porosity is preferably volume % or more, more preferably 38 volume % or more, and especially preferably 40 volume % or more. Within such ranges, a low-refractive index layer having a particularly low refractive index can be formed. The upper limit of the porosity of the low-refractive index layer is e.g. 90 volume % or less, and preferably 75 volume % or less. Within such ranges, a low-refractive index layer with good strength can be formed. The porosity is a value that is calculated according to Lorentz-Lorenz's formula from a value of the refractive index measured with an ellipsometer.

As the low-refractive index layer, for example, a low-refractive index layer with voids as disclosed in Patent Document 3 can be used. The entire disclosure of Patent Document 3 is incorporated herein by reference. Specifically, low-refractive index layers with voids include: essentially spherical particles such as silica particles, silica particles having micropores, and silica hollow nanoparticles; fibrous particles such as cellulose nanofibers, alumina nanofibers, and silica nanofibers; and flat-plate particles such as nanoclay composed of bentonite. In one embodiment, the low-refractive index layer with voids is a porous material composed of particles (e.g., micropored particles) that are chemically bonded directly to one another. The particles composing the low-refractive index layer with voids may be at least partially bonded to one another via a small amount (e.g., less than the mass of the particles) of a binder component. The porosity and refractive index of the low-refractive index layer can be adjusted based on the particle size, particle size distribution, and the like of the particles composing the low-refractive index layer.

Examples of methods of obtaining a low-refractive index layer with voids include methods that are described in Japanese Laid-Open Patent Publication No. 2010-189212, Japanese Laid-Open Patent Publication No. 2008-040171, Japanese Laid-Open Patent Publication No. 2006-011175, International Publication No. 2004/113966, and references thereof. The entire disclosure of Japanese Laid-Open Patent Publication No. 2010-189212, Japanese Laid-Open Patent Publication No. 2008-040171, Japanese Laid-Open Patent Publication No. 2006-011175, International Publication No. 2004/113966 is incorporated herein by reference.

As the low-refractive index layer with voids, porous silica can be suitably used. Porous silica can be produced by the following method, for example: a method involving hydrolyzing and polycondensing at least one of silicon compounds, hydrolyzable silanes and/or silsesquioxanes, and their partial hydrolysates and dehydration-condensation products; a method that uses porous particles and/or hollow microparticles; and a method that generates an aerogel layer using the springback phenomenon, a method of pulverizing a gelatinous silicon compound obtained by sol-gel processing and using a pulverized gel in which micropored particles as the resultant pulverized body are chemically bonded to one another with a catalyst or the like; and so on. However, the low-refractive index layer is not limited to porous silica, and the production method is not limited to the exemplified production methods; any production method may be used for production. However, the porous layer is not limited to porous silica, and the production method is not limited to the exemplified production methods; any production method may be used for production. Silsesquioxane is a silicon compound with ($RSiO_{1.5}$; where R is a hydrocarbon group) as the basic structural unit. Although silsesquioxane is not exactly the same as silica, whose basic structural unit is $SiO_2$, it has a network structure cross-linked by siloxane bonds, similarly to silica. Therefore, any porous material that contains silsesquioxane as its basic structural unit is also referred to as porous silica or silica-based porous material.

Porous silica may be composed of micropored particles of a gelatinous silicon compound that are bonded to one another. An example of micropored particles of a gelatinous silicon compound is a pulverized body of the gelatinous silicon compound. Porous silica may be formed by coating a base with a coating solution that contains a pulverized body of a gelatinous silicon compound, for example. The pulverized body of the gelatinous silicon compound may chemically bonded (e.g., siloxane bonded) through catalytic action, light irradiation, heating, or the like, for example.

The hardness $H_{H1}$ of the hard coat layers 40A and 40B is preferably e.g. pencil hardness H or higher, still more preferably 2H or higher, and more preferably 4H or higher. On the other hand, although there is no limitation as to the upper limit of the hardness $H_{H1}$ of the hard coat layers 40A and 40B, it is preferably pencil hardness 6H or lower, and more preferably 5H or lower. The pencil hardness is measure by a method that complies with the "pencil hardness test" under JIS K 5400. The hard coat layers 40A and 40B each independently have a thickness of preferably not less than 1 μm and not more than 30 μm, more preferably not less than 2 μm and not more than 20 μm, and still more preferably not less than 3 μm and not more than 15 μm. When the thickness of the hard coat layers 40A and 40B is in such ranges, good scratch resistance is provided.

So long as the aforementioned properties are attained, the hard coat layers 40A and 40B may be made of any appropriate material. The hard coat layers 40A and 40B are cured layers of a thermosetting resin or an ionizing radiation (e.g., visible light or ultraviolet)-curable resin, for example. Examples of such curable resins include acrylates such as urethane (meth)acrylate, polyester (meth)acrylate, and epoxy (meth)acrylate, silicone resins such as polysiloxane, unsaturated polyesters, and epoxy resins. The hard coat layers 40A and 40B can be formed by coating the base surface of interest with a material containing a solvent and a curable compound, for example, and curing it. Details of a hard coat layer that is suitably used as the hard coat layers 40A and 40B is described in Japanese Laid-Open Patent Publication No. 2011-237789, for example. The entire disclosure of Japanese Laid-Open Patent Publication No. 2011-237789 is incorporated herein by reference.

A sheet-shaped illumination device according to an embodiment of the present invention has high visible light transmittance, and therefore can be used as a window capable of lighting. For example, in the indoor direction, it may be used as a lighting window; and in the outdoor direction, it may be used as a device to emit light downward (or upward). For example, the light emitted in the outdoor direction of the window can be used for an advertisement.

INDUSTRIAL APPLICABILITY

An illumination device according to an embodiment of the present invention is capable of emitting light from two principal faces that are oriented in opposite directions from each other. An illumination device according to an embodiment of the present invention can provide a novel application.

REFERENCE SIGNS LIST

10: lightguide layer, 60A, 60B: redirection layer, 20A, 20B: low-refractive index layer, 30: base layer, 40A, 40B: hard coat layer and/or anti-reflection layer, 52, 54, 55, 56, 58: adhesive layer, 62A, 62B: textured film, 64A, 64B: internal space, recess, 100A: illumination device, 100A(G): lightguide component for illumination devices, ISa: first slope, ISb: second slope, LRa: first light, LRb: second light, LS: light source

The invention claimed is:

1. A lightguide component for illumination devices having a first exit surface and a second exit surface at an opposite side from the first exit surface, the lightguide component comprising:
a light-receiving portion to receive light emitted from a light source;
a lightguide layer having a first principal face at the first exit surface side and a second principal face at the second exit surface side; and
a light distribution controlling structure having a plurality of internal spaces, wherein,
each of the plurality of internal spaces includes a first slope to direct a portion of light propagating in the lightguide layer toward the first exit surface via total internal reflection, and a second slope at an opposite side from the first slope, and
the lightguide component is configured to emit first light having a first intensity distribution through the first exit surface and to emit second light having a second intensity distribution through the second exit surface.

2. The lightguide component for illumination devices of claim 1, wherein, given a first principal ray being defined as a ray having a largest intensity in the first intensity distribution and a second principal ray being defined as a ray having a largest intensity in the second intensity distribution, an intensity of the first principal ray: an intensity of the second principal ray is within a range from 1:4 to 4:1.

3. The lightguide component for illumination devices of claim 2, wherein the intensity of the first principal ray/the intensity of the second principal ray is within a range from 0.5 to 1.3.

4. The lightguide component for illumination devices of claim 2, wherein a polar angle $\theta1$ of the first principal ray from a normal of the first exit surface is smaller than a polar angle $\theta2$ of the second principal ray from a normal of the second exit surface.

5. The lightguide component for illumination devices of claim 4, wherein the polar angle $\theta1$ is 0° or more but less than 40°, and the polar angle $\theta2$ is 30° or more but less than 70°.

6. The lightguide component for illumination devices of claim 2, wherein the first principal ray has a half maximum angle of 67° or less along a light-guiding direction of the lightguide layer.

7. The lightguide component for illumination devices of claim 2, wherein the first principal ray has a half maximum angle of 24° or more along a light-guiding direction of the lightguide layer.

8. The lightguide component for illumination devices of claim 1, wherein the light distribution controlling structure is formed in a redirection layer that is disposed at the first principal face side or the second principal face side of the lightguide layer.

9. The lightguide component for illumination devices of claim 1, wherein a sloping angle $\theta a$ of the first slope is not less than 10° and not more than 70°.

10. The lightguide component for illumination devices of claim 1, wherein a sloping angle $\theta b$ of the second slope is not less than 50° and not more than 100°.

11. The lightguide component for illumination devices of claim 1, wherein, when the lightguide layer is viewed from a normal direction of the first principal face of the lightguide layer, a ratio of an area of the plurality of internal spaces to an area of the lightguide layer is 80% or less.

12. The lightguide component for illumination devices of claim 1, wherein the plurality of internal spaces are disposed discretely along a light-guiding direction of the lightguide layer and along a direction that intersects the light-guiding direction.

13. The lightguide component for illumination devices of claim 1, wherein, when the lightguide layer is viewed from a normal direction of the first principal face of the lightguide layer, the first slope presents a curved surface that is convex toward the light-receiving portion.

14. The lightguide component for illumination devices of claim 1, having a visible light transmittance of 60% or more and a haze value of less than 30%.

15. An illumination device comprising:
the lightguide component for illumination devices of claim 1; and
a light source to emit light toward the light-receiving portion.

* * * * *